United States Patent
Sanjeewa

(10) Patent No.: US 8,948,252 B2
(45) Date of Patent: Feb. 3, 2015

(54) MOVING PICTURE TRANSMISSION APPARATUS, MOVING PICTURE TRANSMISSION SYSTEM, MOVING PICTURE TRANSMISSION METHOD, AND PROGRAM

(75) Inventor: Ranatunga Vijitha Sanjeewa, Kanagawa (JP)

(73) Assignee: Sony Corporation, Tokyo (JP)

( * ) Notice: Subject to any disclaimer, the term of this patent is extended or adjusted under 35 U.S.C. 154(b) by 842 days.

(21) Appl. No.: 13/065,252

(22) Filed: Mar. 17, 2011

(65) Prior Publication Data
US 2011/0243217 A1   Oct. 6, 2011

(30) Foreign Application Priority Data

Mar. 30, 2010  (JP) ............................... P2010-079069
Mar. 30, 2010  (JP) ............................... P2010-079070

(51) Int. Cl.
  *H04N 7/12*      (2006.01)
  *H04N 19/166*    (2014.01)
  *H04N 21/24*     (2011.01)
  *H04N 21/4425*   (2011.01)
  *H04N 21/6373*   (2011.01)
  *H04N 21/6375*   (2011.01)

(52) U.S. Cl.
  CPC ..... *H04N 19/00242* (2013.01); *H04N 21/2404* (2013.01); *H04N 21/4425* (2013.01); *H04N 21/6373* (2013.01); *H04N 21/6375* (2013.01)
  USPC ................................. 375/240.02; 375/240.01

(58) Field of Classification Search
  None
  See application file for complete search history.

(56) References Cited

U.S. PATENT DOCUMENTS

| | | | |
|---|---|---|---|
| 7,907,785 B2 | 3/2011 | Fukuhara et al. | |
| 2003/0081845 A1* | 5/2003 | Mukherjee et al. | 382/239 |
| 2007/0177719 A1* | 8/2007 | Dei et al. | 380/28 |
| 2008/0181300 A1* | 7/2008 | Hosaka et al. | 375/240.03 |
| 2010/0119157 A1* | 5/2010 | Kameyama | 382/195 |
| 2010/0329358 A1* | 12/2010 | Zhang et al. | 375/240.26 |

FOREIGN PATENT DOCUMENTS

JP   2007-311924 A   11/2007

* cited by examiner

*Primary Examiner* — Mehrdad Dastouri
*Assistant Examiner* — James Anderson, II
(74) *Attorney, Agent, or Firm* — Sony Corporation

(57) ABSTRACT

In a moving picture in which data corresponding to one picture is required for display, data corresponding to one picture is divided into line blocks including a predetermined number of pixel lines and captured as block data. A compression rate of each block data is dynamically set according to a capture point in time of each block data. Each block data is compressed at the set compression rate and transmitted to a reception apparatus through a transmission path. On a plurality of block data, a series of processes including the capture and the transmission of each block data is performed in parallel while shifting only a time required for the capture. Block data that is late in start order of the capture, among the data corresponding to one picture, is set to be lower in compression rate than block data that is early in start order of the capture.

9 Claims, 18 Drawing Sheets

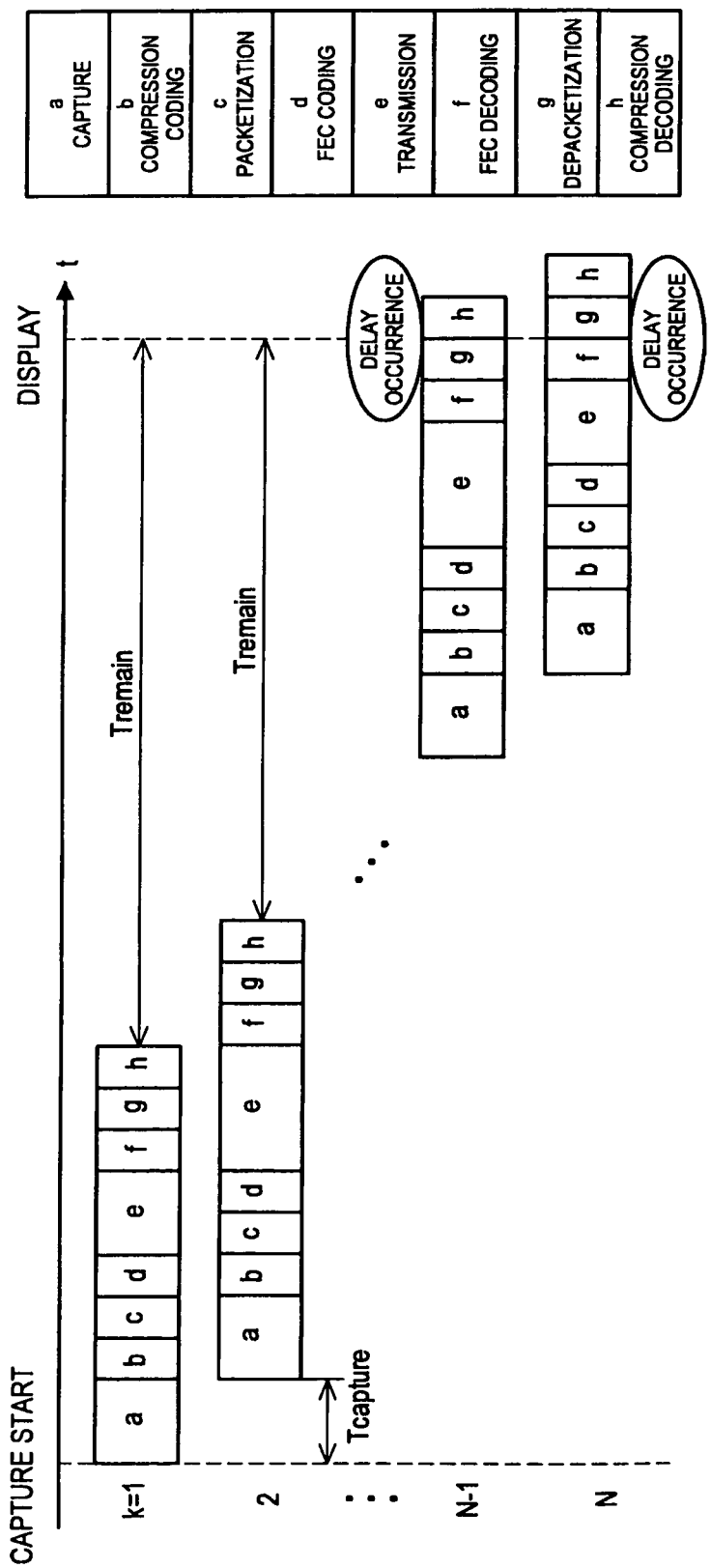

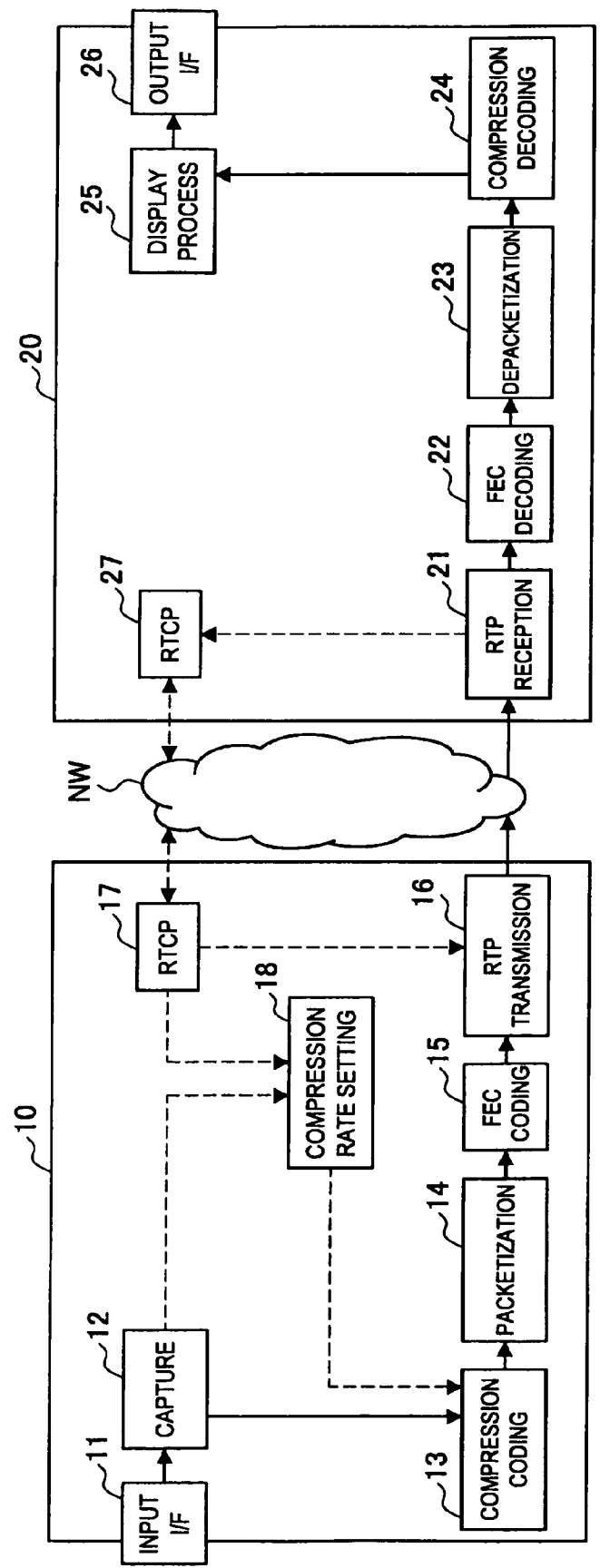

FIG.5
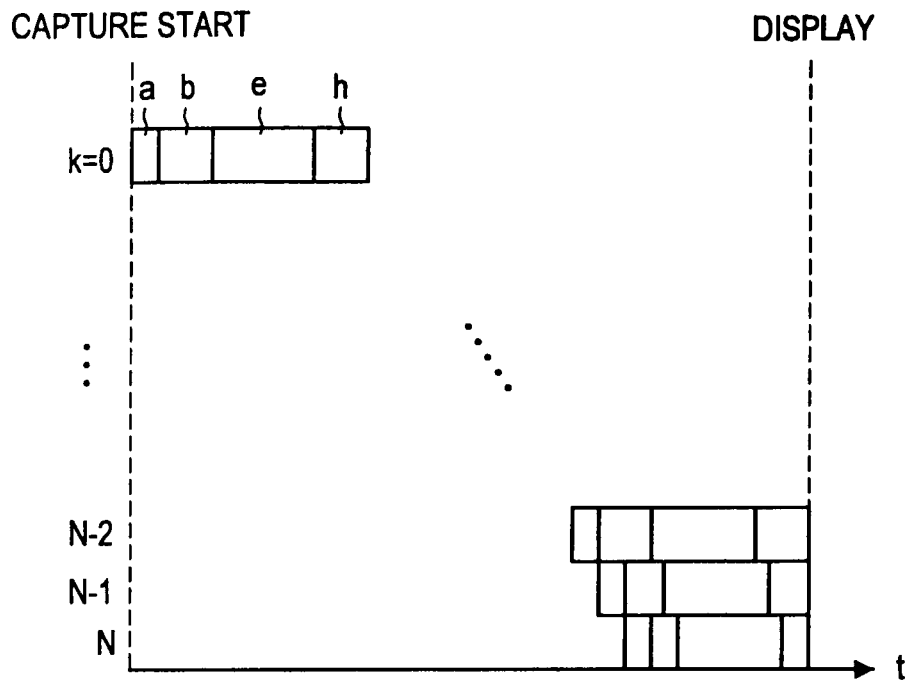
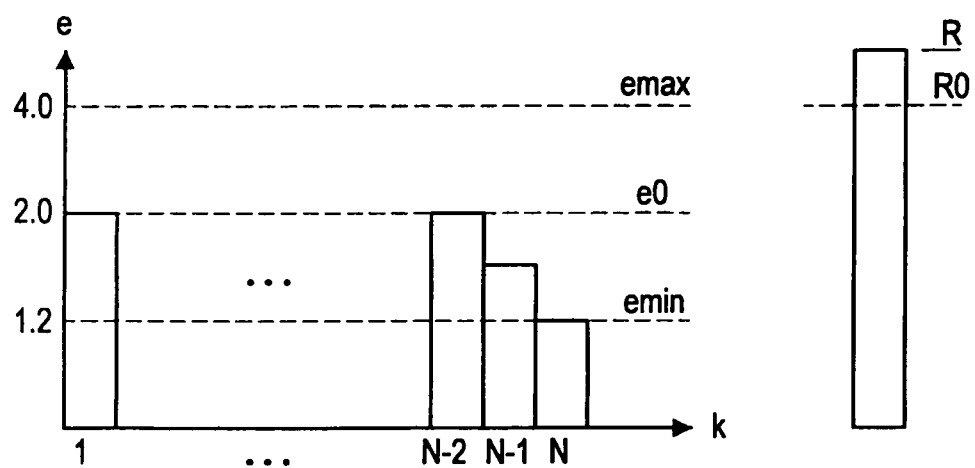

FIG.6
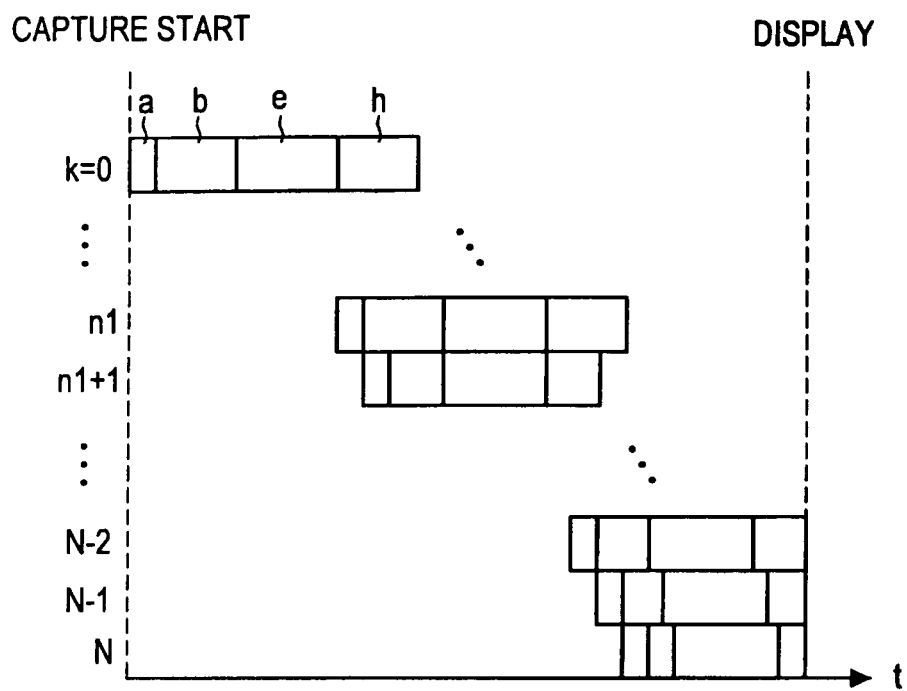
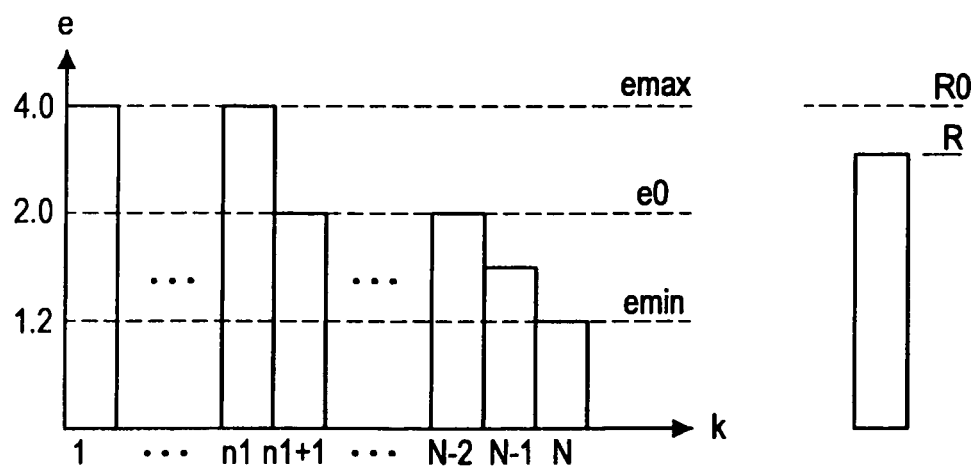

FIG.7
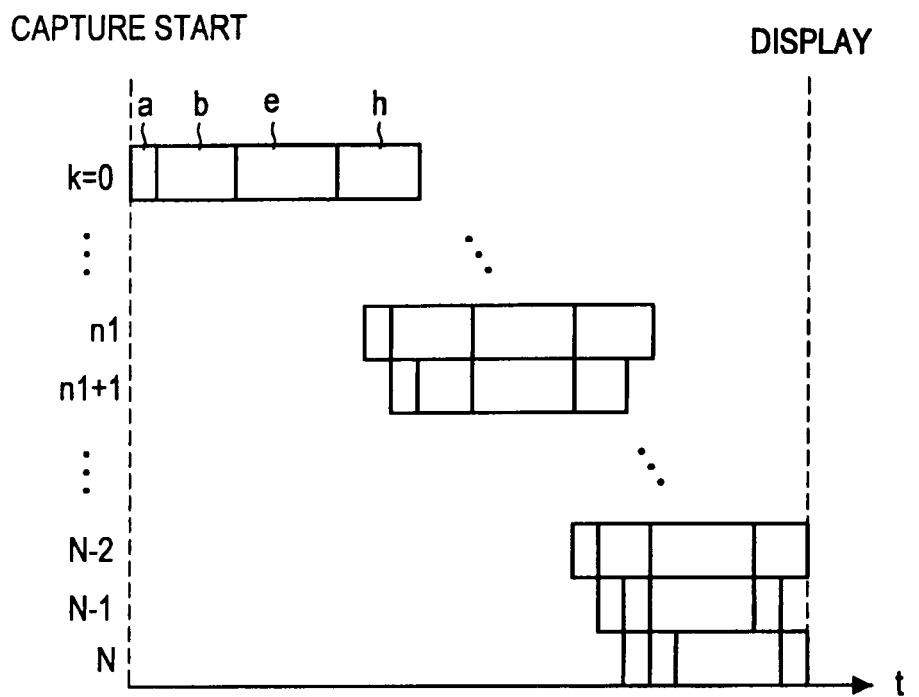
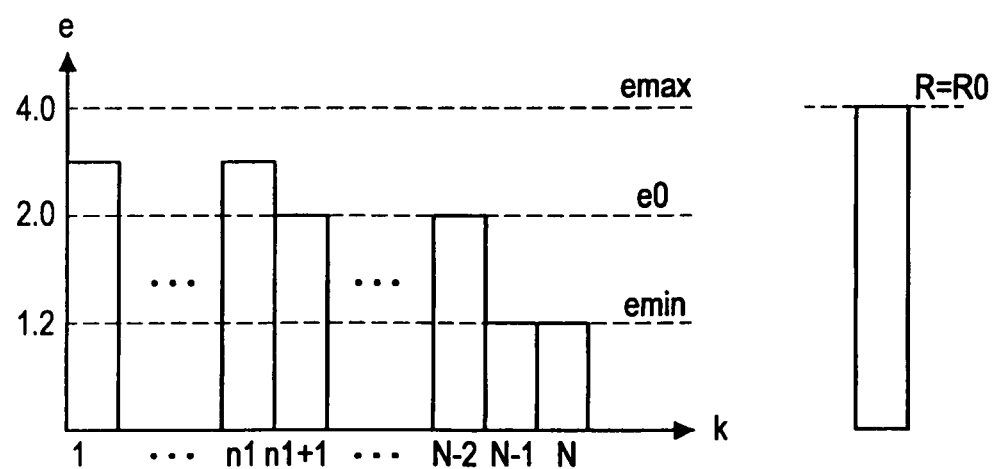

FIG.8A
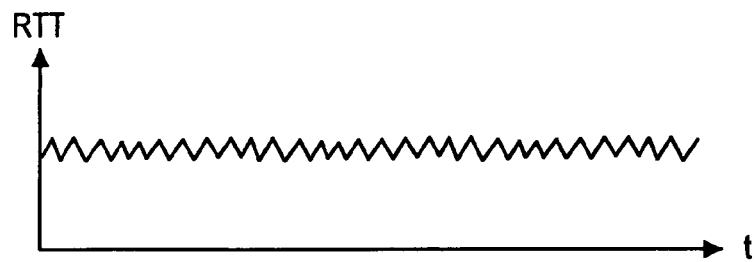
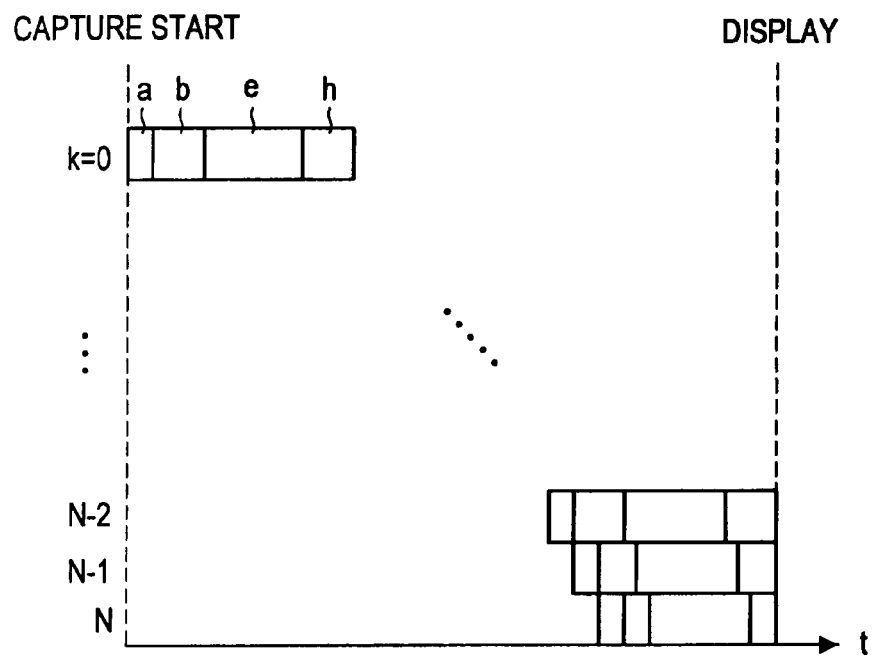
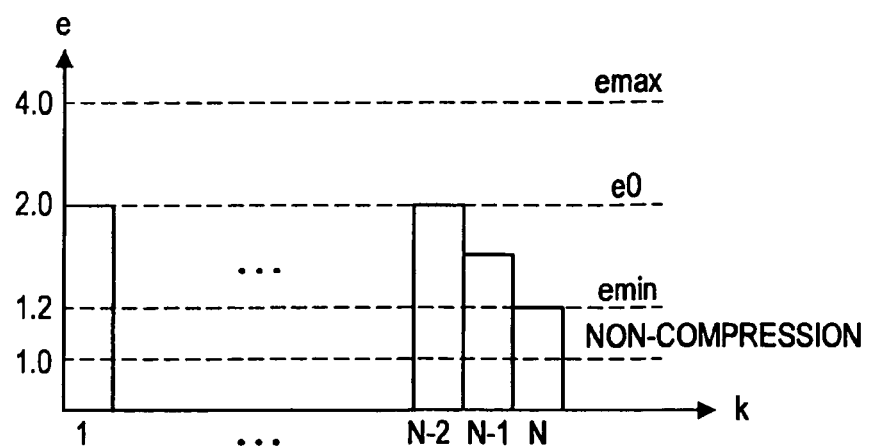

FIG.8B
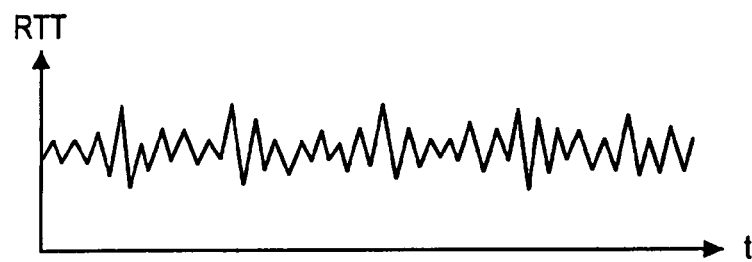
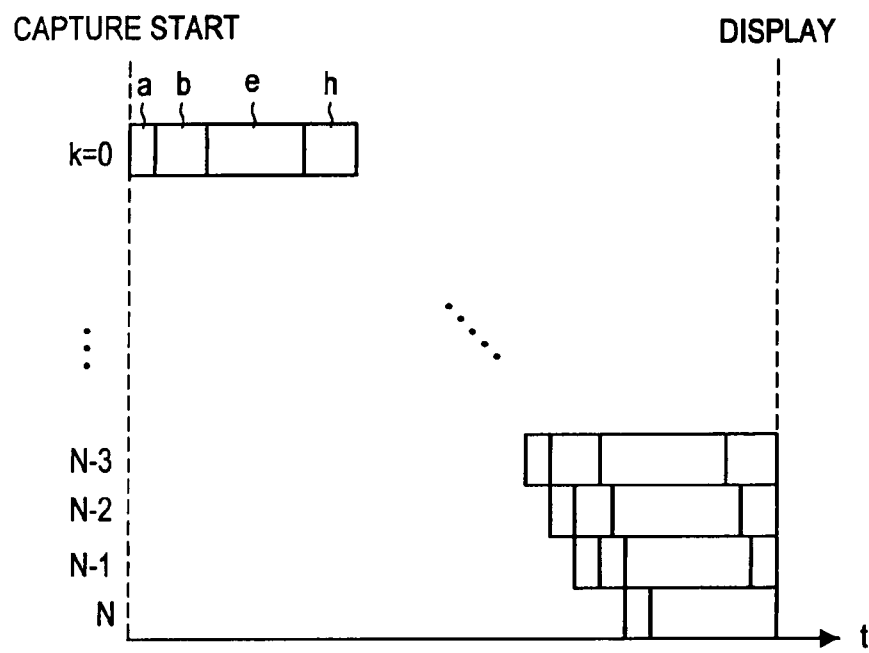
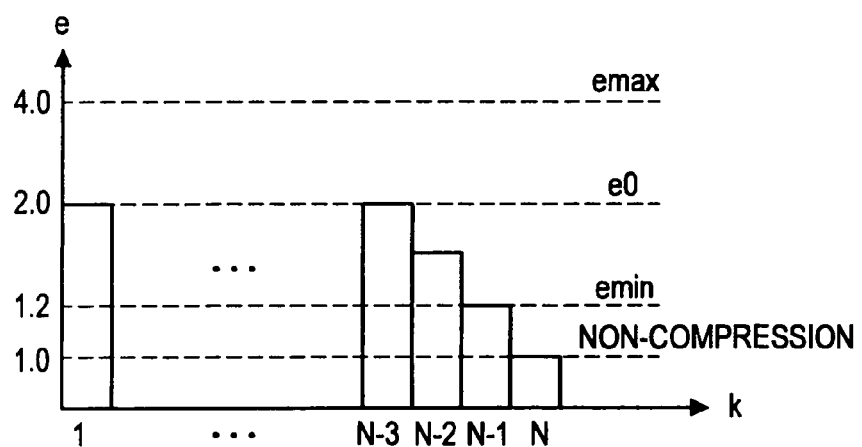

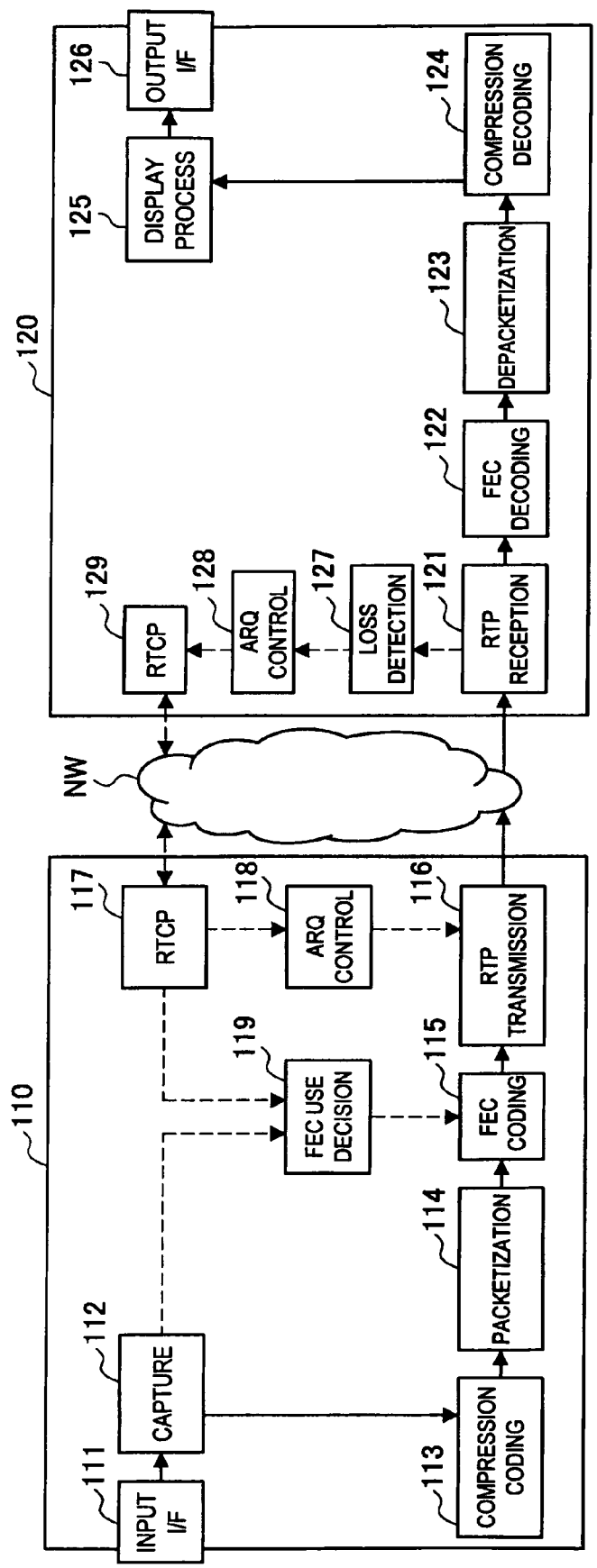

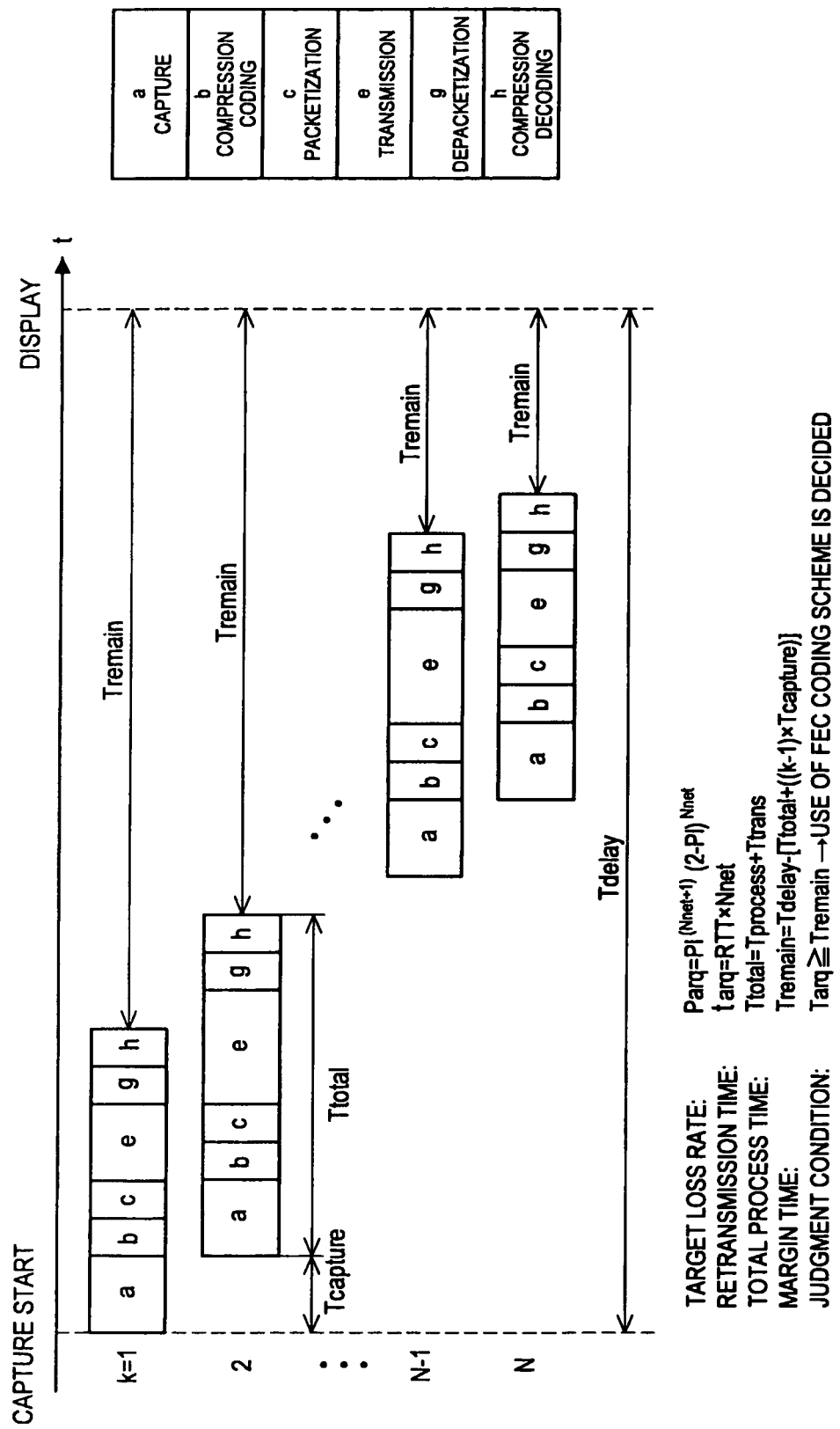

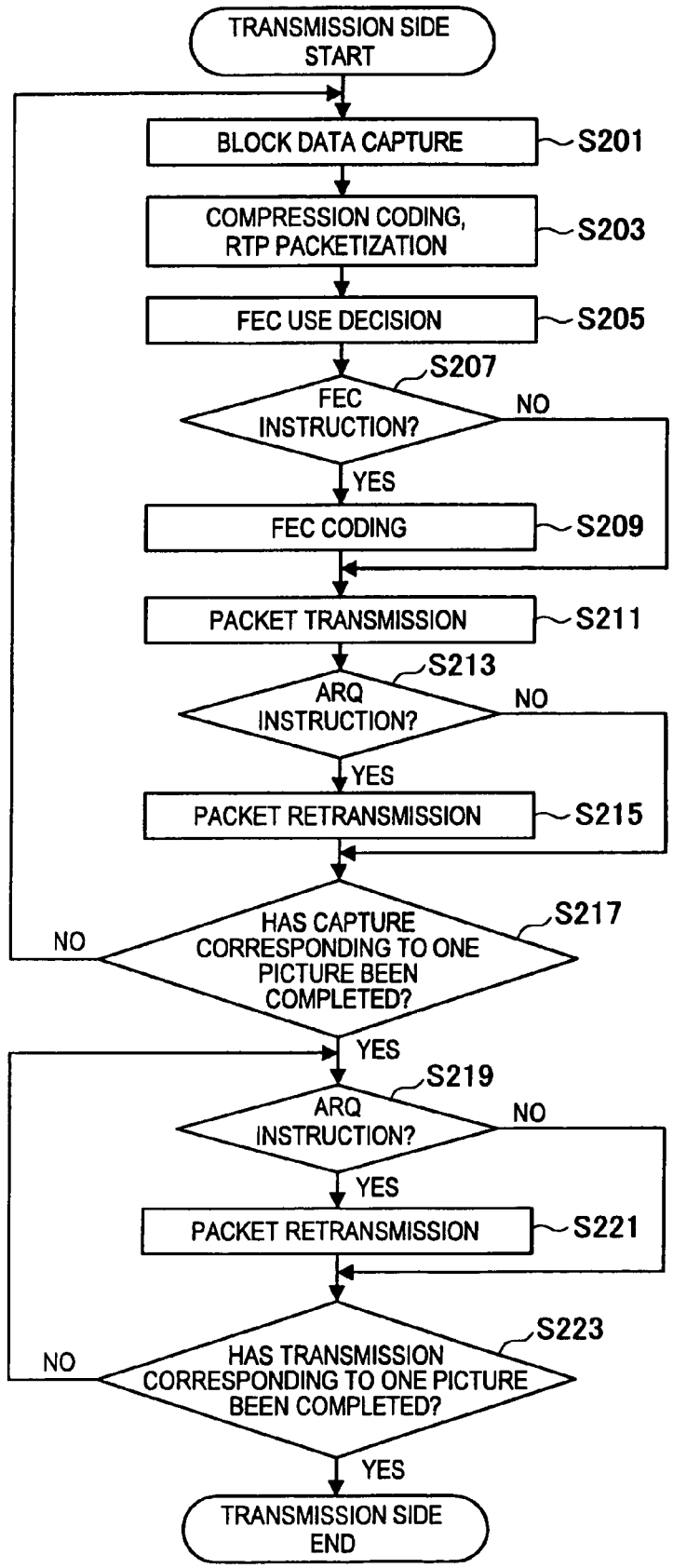

MOVING PICTURE TRANSMISSION APPARATUS, MOVING PICTURE TRANSMISSION SYSTEM, MOVING PICTURE TRANSMISSION METHOD, AND PROGRAM

CROSS-REFERENCE TO RELATED APPLICATION

The present application claims priority from Japanese Patent Application Nos. JP 2010-079069 and JP 2010-079070 both filed in the Japanese Patent Office on Mar. 30, 2010, the entire contents of which are incorporated herein by reference.

BACKGROUND OF THE INVENTION

1. Field of the Invention

The present invention relates to a moving picture transmission apparatus, a moving picture transmission system, a moving picture transmission method, and a program.

2. Description of the Related Art

In recent years, it has become necessary to transmit data such as a moving picture through a transmission path such as the Internet with little delay. For example, when transmitting the moving picture in real time, it is necessary to transmit moving picture data with a delay equal to or less than a frame interval of the moving picture.

For this reason, Japanese Patent Application Laid-Open Publication No. 2007-311924 discloses a technique of dividing data corresponding to one picture into line blocks configured with a predetermined number of pixel lines and compressing the line blocks as block data (a line block unit scheme).

According to the technique, even when all data corresponding to one picture is not completely captured, a transmission side can start a subsequent process for each block data. Similarly, even when all data corresponding to one picture is not completely received, a reception side can start a subsequent process for each block data. Therefore, if a propagation delay of a transmission path is sufficiently small, the moving picture can be transmitted with a delay equal to or less than the frame interval.

However, depending on a display device that displays the moving picture, there is a case where all data corresponding to one picture is required for display. In this case, even when the subsequent process can start for each block data, the moving picture cannot be displayed until the subsequent process on all block data corresponding to one picture is completed. For this reason, a display point in time of the moving picture depends on a point in time when the subsequent process of block data finally captured among block data corresponding to one picture is completed.

However, in the typical moving picture transmission, block data is compression-encoded at a predetermined compression rate at a transmission side, is transmitted through a transmission path, and is compression-decoded at a reception side. In the moving picture transmission of the line block unit scheme, there are many cases where block data that is late in capture start order among block data corresponding to one picture has no time margin from a capture start point in time to a display point in time.

Further, for transmission of the moving picture, as an error correction technique at the time of transmission, a forward error correction (FEC) coding scheme is frequently used. In the FEC coding scheme, a transmission side performs redundant coding on original data and transmits a plurality of packets including a redundant packet through a transmission path. A reception side receives a predetermined number of packets among the plurality of packets and decodes the original data.

SUMMARY OF THE INVENTION

For this reason, if block data that is late in capture start order is compressed at a high compression rate, a compression process (encoding and decoding) requires much time, and all data corresponding to one picture may not be prepared by the display point in time.

In the moving picture transmission using the FEC coding scheme, in order to transmit the redundant packet, many communication resources such as a band of the transmission path and a processing time required for the FEC process (coding and decoding) are expended.

In light of the foregoing, it is desirable to provide a moving picture transmission apparatus, a moving picture transmission system, a moving picture transmission method, and a program in which the moving picture in which all data corresponding to one picture is required for display can be transmitted with little delay.

According to an embodiment of the present invention, there is provided a moving picture transmission apparatus, including a capture unit that, in a moving picture in which data corresponding to one picture is required for display, divides the data corresponding to one picture into line blocks including a predetermined number of pixel lines and captures the divided line blocks as block data, a compression rate setting unit that dynamically sets a compression rate of each block data according to a capture point in time of each block data, and a transmission unit that compresses each block data at the set compression rate and transmits the compressed block data to a reception apparatus through a transmission path, wherein the capture unit and the transmission unit perform a series of processes including the capture and the transmission of each block data in parallel, on a plurality of block data, while shifting only a time required for the capture, and the compression rate setting unit sets block data that is late in start order of the capture, among the data corresponding to one picture, to be lower in compression rate than block data that is early in start order of the capture.

The compression rate setting unit may set a compression rate of a predetermined number of block data that is latest in start order of the capture, among the data corresponding to one picture, to be lower than a reference compression rate.

The compression rate setting unit may set a compression rate of a predetermined number of block data that is latest in start order of the capture, among the data corresponding to one picture, to a minimum compression rate.

The block data may be transmittable in an uncompressed state, the compression rate setting unit may set a compression rate of a predetermined number of block data that is latest in start order of the capture, among the data corresponding to one picture, to 1.0.

The compression rate setting unit may set a compression rate of a predetermined number of block data that is early in start order of the capture, among the data corresponding to one picture, to be higher than a reference compression rate.

The status of the transmission path may be stable, the compression rate setting unit may set a compression rate of a predetermined number of block data that is latest in start order of the capture, among the data corresponding to one picture, to a low value or 1.0.

The status of the transmission path may be unstable, the compression rate setting unit may set a compression rate of a larger number of block data compared to when the status of the transmission path is stable, among the data corresponding to one picture, to a low value or 1.0.

According to another embodiment of the present invention, there is provided a moving picture transmission method, including in a moving picture in which data corresponding to one picture is required for display, dividing the data corresponding to one picture into line blocks including a predetermined number of pixel lines and capturing the divided line blocks as block data, dynamically setting a compression rate of each block data according to a capture point in time of each block data, compressing each block data at the set compression rate and transmitting the compressed block data to a reception apparatus through a transmission path, and performing a series of processes including the capture and the transmission of each block data in parallel, on a plurality of block data, while shifting only a time required for the capture, wherein, in the setting, block data that is late in start order of the capture, among the data corresponding to one picture, is set to be lower in compression rate than block data that is early in start order of the capture.

According to another embodiment of the present invention, there is provided a program causing a computer to execute the above-mentioned moving picture transmission method.

According to another embodiment of the present invention, there is provided a moving picture transmission apparatus, including a capture unit that, in a moving picture in which data corresponding to one picture is required for display, divides the data corresponding to one picture into line blocks including a predetermined number of pixel lines and captures the divided line blocks as block data, a forward error correction (FEC) use decision unit that dynamically decides whether a FEC coding scheme is to be used as an error correction scheme of a packet of each block data according to a status of a transmission path and a capture point in time of each block data, and a transmission unit that transmits each packet, in which, on a packet that uses the FEC coding scheme, FEC redundant coding has been performed, and on a packet that does not use the FEC coding scheme, FEC redundant coding has not been performed, to a reception apparatus through the transmission path, and retransmits a lost packet to the reception apparatus by an automatic retransmission (ARQ) scheme when packet loss occurs on the packet that does not use the FEC coding scheme, wherein the capture unit and the transmission unit perform a series of processes including capture and transmission of each block data in parallel, on a plurality of block data, while shifting only a time required for the capture.

The lost packet may not be able to be restored while achieving a predetermined target loss rate after error correction through retransmission of the lost packet within a margin time from a completion scheduled point in time when completion of a process required for displaying each block data is expected to a display point in time of the moving picture, the FEC use decision unit may decide a use of the FEC coding scheme.

The FEC use decision unit may decide a use of the FEC coding scheme in view of a round trip time (RTT) of the transmission path and a packet loss rate.

The FEC coding scheme may be to be used, the FEC use decision unit may decide a redundancy of the FEC coding so that a predetermined target loss rate is able to be achieved.

According to another embodiment of the present invention, there is provided a moving picture transmission method, including the steps of in a moving picture in which data corresponding to one picture is required for display, dividing the data corresponding to one picture into line blocks including a predetermined number of pixel lines and capturing the divided line blocks as block data, dynamically deciding whether a forward error correction (FEC) coding scheme is to be used as an error correction scheme of a packet of each block data according to a status of a transmission path and a capture point in time of each block data, transmitting each packet to a reception apparatus through the transmission path, wherein, on a packet that uses the FEC coding scheme, FEC redundant coding is performed on each packet, and on a packet that does not use the FEC coding scheme, the FEC redundant coding is not performed on each packet, retransmitting a lost packet to the reception apparatus by an automatic retransmission (ARQ) scheme when packet loss occurs on the packet that does not use the FEC coding scheme, and performing a series of processes including a capturing step and a transmitting step of each block data in parallel, on a plurality of block data, while shifting only a time required for the capture.

According to another embodiment of the present invention, there is provided a program causing a computer to execute the above-mentioned moving picture transmission method.

As described above, according to the present invention, it is possible to provide a moving picture transmission apparatus, a moving picture transmission system, a moving picture transmission method, and a program in which the moving picture in which all data corresponding to one picture is required for display can be transmitted with little delay.

BRIEF DESCRIPTION OF THE DRAWINGS

FIG. 3B is a diagram (2/2) illustrating a process status of moving picture transmission by a line block unit scheme according to the first embodiment of the present invention.

FIG. 4 is a block diagram illustrating major functional configurations of a transmission apparatus and a reception apparatus.

FIG. 5 is a diagram illustrating a scenario A of dynamic setting of a compression rate.

FIG. 6 is a diagram illustrating a scenario B of dynamic setting of a compression rate.

FIG. 7 is a diagram illustrating a scenario C of dynamic setting of a compression rate.

FIG. 8A is a diagram (1/2) illustrating a scenario D of dynamic setting of a compression rate.

FIG. 8B is a diagram (2/2) illustrating a scenario D of dynamic setting of a compression rate.

FIG. 11 is a block diagram illustrating major functional configurations of a transmission apparatus and a reception apparatus.

FIG. 12 is a diagram for explaining a judgment condition for deciding a use of a FEC coding scheme.

FIG. 13A is a flowchart (1/2) illustrating an operation procedure of a moving picture transmission system.

DETAILED DESCRIPTION OF THE EMBODIMENT(S)

Figure 1:
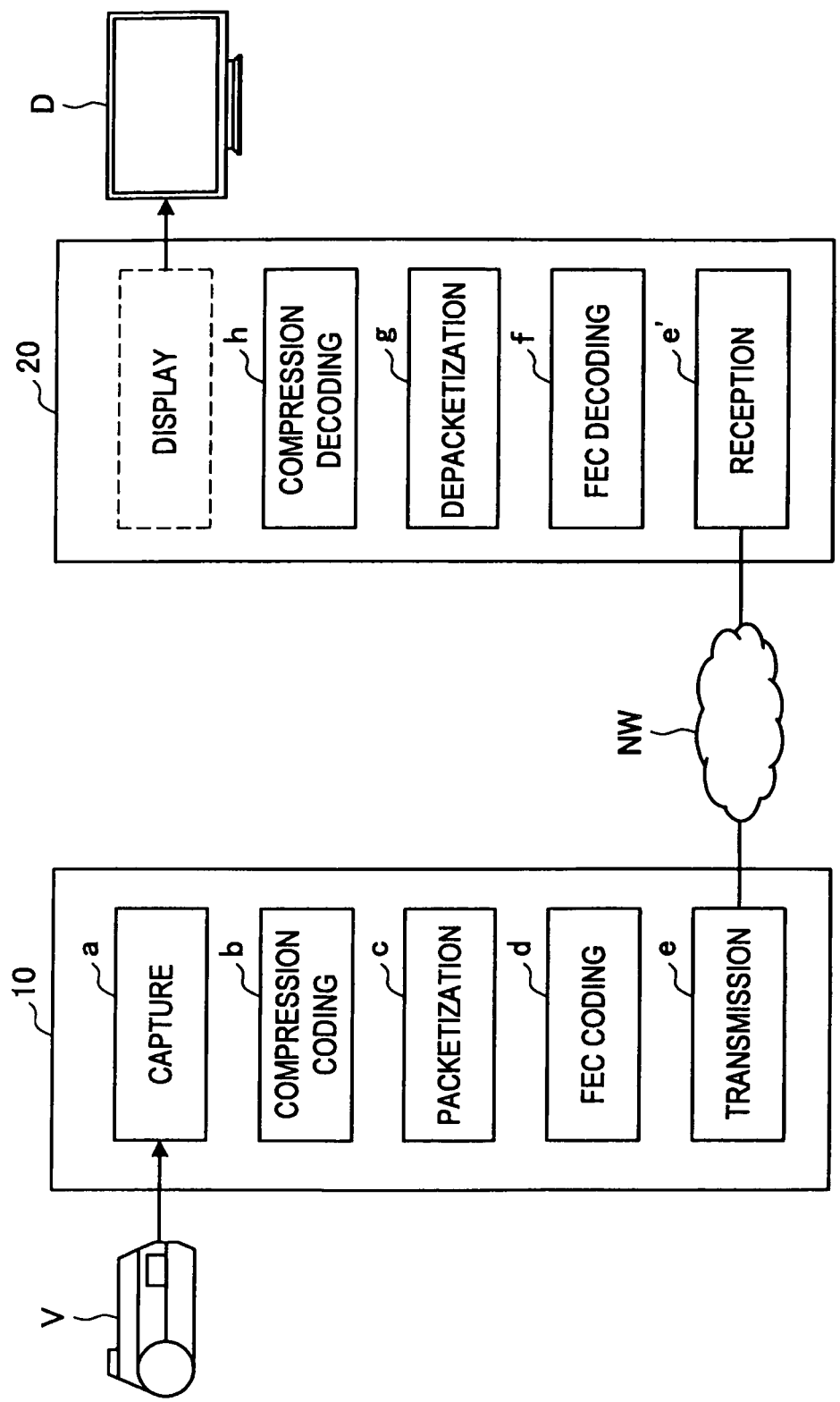
FIG. 1 is a diagram illustrating an overall configuration of a transmission system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In this disclosure, exemplary embodiments of the present invention will be described in the following order:

1. Overall configuration of moving picture transmission system
2. Moving picture transmission process of line block unit scheme
3. Moving picture transmission system according to first embodiment
   3-1. Process status of moving picture transmission
   3-2. Configurations of transmission apparatus and reception apparatus
   3-3. Dynamic setting of compression rate
   3-4. Operation of moving picture transmission system
   3-5. Summary
4. Moving picture transmission system according to second embodiment
   4-1. Process status of moving picture transmission
   4-2. Configurations of transmission apparatus and reception apparatus
   4-3. Use judgment of FEC coding scheme
   4-4. Operation of moving picture transmission system
   4-5. Summary

[1. Overall Configuration of Moving Picture Transmission System]

First, an overall configuration of a moving picture transmission system according to an embodiment of the present invention will be described with reference to FIG. 1. FIG. 1 illustrates an overall configuration of a moving picture transmission system.

As illustrated in FIG. 1, a moving picture transmission system includes a transmission apparatus 10 that can transmit moving picture data through a transmission path NW such as the Internet and a reception apparatus 20. The moving picture data is transmitted by a stream transmission scheme such as a real time transport protocol (RTP) specified in IETF RFC3550.

The transmission apparatus 10 is connected to a moving picture input apparatus such as a video camera V, and the reception apparatus 20 is connected to a moving picture output apparatus such as a display D. The transmission apparatus 10 may be configured integrally with the video camera V, and the reception apparatus 20 may be configured integrally with the display D.

The transmission apparatus 10 takes (captures) a moving picture signal input from the video camera V as data (a), performs compression coding (b), performs packetization (c), performs forward error correction (FEC) coding (d), and performs transmission to the reception apparatus 20 through the transmission path NW (e).

Meanwhile, the reception apparatus 20 receives data from the transmission apparatus 10 through the transmission path NW (e'), performs FEC decoding (f), performs depacketization (g), and performs compression decoding (h). When the processes (e') to (h) on all data corresponding to one picture are completed, the reception apparatus 20 performs a display process and outputs data corresponding to one picture to the display D. The display D displays the moving picture.

[2. Moving Picture Transmission Process of Line Block Unit Scheme]

Next, a moving picture transmission process of the line block unit scheme will be described with reference to FIG. 2.

Figure 2:
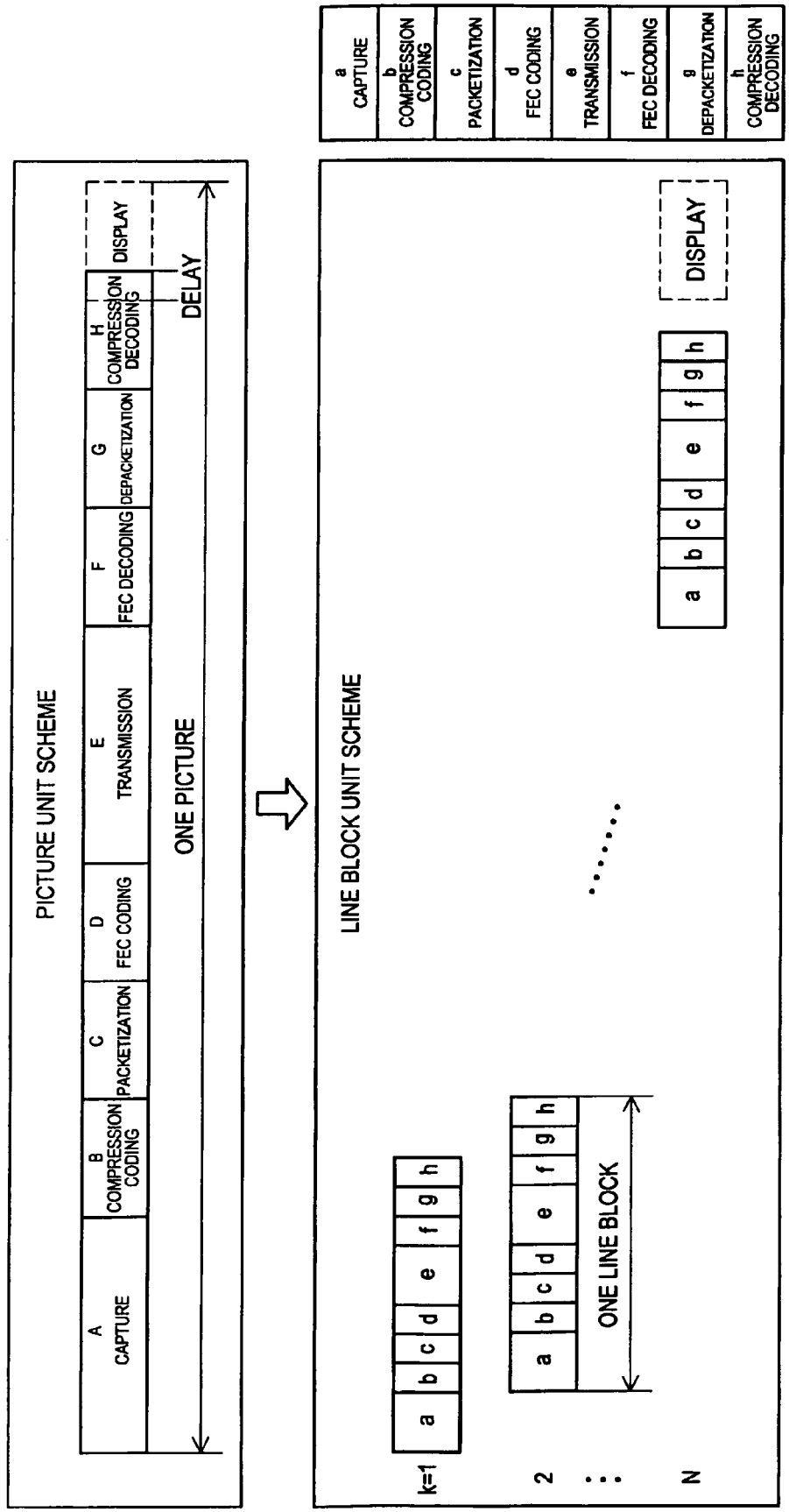
FIG. 2 is a diagram illustrating a comparison between a moving picture transmission process of a picture unit scheme and a moving picture transmission process of a line block unit scheme.

FIG. 2 comparatively illustrates a moving picture transmission process of the picture unit scheme and a moving picture transmission process of the line block unit scheme. Hereinafter, a description will be made under the assumption that data corresponding to one picture is divided into line blocks of line block numbers k=1 to N.

As illustrated in FIG. 2, in the picture unit scheme, each of processes (A) to (H), i.e., the capture (A), the compression coding (B), the packetization (C), the FEC coding (D), the transmission (E), the FEC decoding (F), the depacketization (G), and the compression decoding (H), is executed in units of pictures. For this reason, the transmission side cannot start the subsequent processes (B) to (E) until the capture (A) of data corresponding to one picture is completed. Further, the reception side cannot start the subsequent processes (F) to (H) until the transmission (E) of data corresponding to one picture is completed.

Meanwhile, in the line block unit scheme, each of processes (a) to (h), i.e., the capture (a), the compression coding (b), the packetization (c), the FEC coding (d), the transmission (e), the FEC decoding (f), the depacketization (g), and the compression decoding (h) is executed in units of line blocks. That is, even when the capture (A) of data corresponding to one picture is not completed, when the capture (a) of data of a line block unit is completed, the transmission side can sequentially start the subsequent processes (b) to (e). Further, when the transmission (e) of data of a line block unit is completed, the reception side can sequentially start the subsequent processes (f) to (h).

Further, when the capture (a) of the block data of the line block number k=1 is completed, the transmission side sequentially starts the subsequent processes (b) to (e) and starts the capture (a) of the block data of k=2. That is, the processes (a) to (e) are executed in parallel in units of line blocks. Similarly to the transmission side, the reception side executes the processes (f) to (h) in parallel in units of line blocks.

For this reason, in the picture unit scheme, a delay occurring in at least one of the processes (A) to (H) is accumulated as a delay of the process corresponding to one picture as is, and a delay of the entire process from the capture (A) to the display increases. However, in the line block unit scheme, a delay occurring in at least one of the processes (a) to (h) is absorbed during the process between line blocks and not accumulated as a delay of the process corresponding to one picture as is. Therefore, the delay of the entire process from the first capture start (a) to the display is suppressed.

<3. Moving Picture Transmission System According to First Embodiment>

A moving picture transmission system according to a first embodiment will be described below. According to the moving picture transmission system of the present embodiment, the moving picture in which all data corresponding to one picture is required for display may be transmitted with little delay.

[3-1. Process Status of Moving Picture Transmission]

Figure 3A:
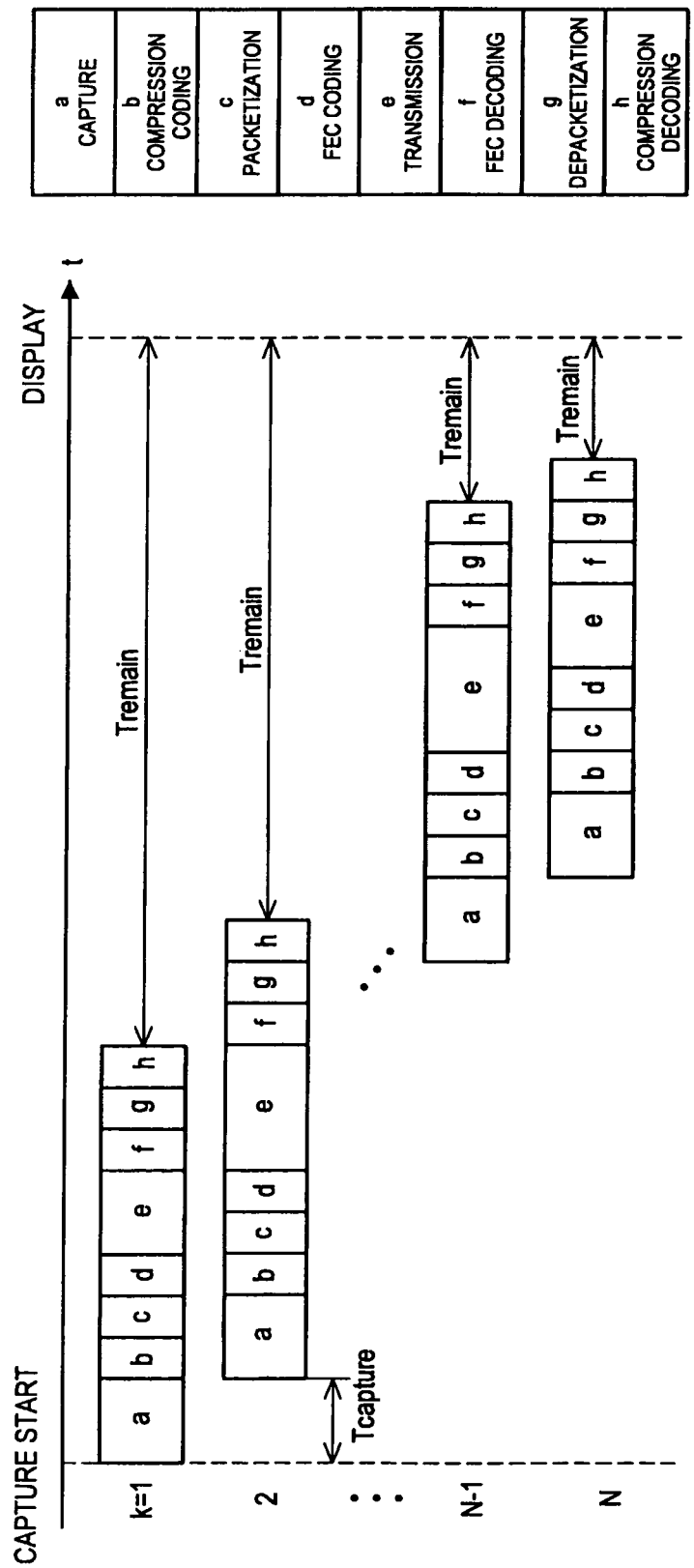
FIG. 3A is a diagram (1/2) illustrating a process status of moving picture transmission by a line block unit scheme according to a first embodiment of the present invention.

FIGS. 3A and 3B illustrate process statuses of moving picture transmission by the line block unit scheme according to the present embodiment. FIGS. 3A and 3B illustrate the processes (a) to (h) executed in units of line blocks.

In FIG. 3A, on the moving picture corresponding to one picture, the capture start point in time and the display point in time of the moving picture are illustrated on a horizontal axis. Further, processing blocks of line block units are illustrated in parallel in a vertical axis direction in a process start order.

As illustrated in FIG. 3A, the processing blocks are processed in parallel with an offset Tcapture corresponding to a processing time required in the capture (a). The processing times required in the compression coding (b) and the compression decoding (h) change according to the compression rate e of the block data, and the processing time required in the transmission (e) changes according to a status of the transmission path NW.

Since each processing block starts with the offset Tcapture, the processing block that is early in capture start order has a sufficient margin time Tremain between completion of the processes (a) to (h) and the display point in time. However, the processing block that is late in capture start order has little margin time Tremain.

For this reason, as illustrated in FIG. 3B, in the case of the processing block that is early in capture start order, even when the compression rate e of the block data is high, the compression process (encoding and decoding) can be comparatively easily completed by the display point in time. However, in the case of the processing block that is late in capture start order, if the compression rate e of the block data is high, particularly, if the status of the transmission path NW is unstable, it may be difficult to complete the compression process by the display point in time, causing a transmission delay. Therefore, in the moving picture transmission process of the line block unit scheme, the block data that is late in capture start order, particularly, the last block data, becomes critical on the transmission delay.

For this reason, in the present embodiment, the compression rate e of the block data is dynamically set according to the capture start point in time of the block data. The compression rate e of the block data that is late in start order is set lower than that of the block data that is early in capture start order. Further, in the present embodiment, it is assumed that the transmission path NW has a sufficiently large band, and a time required for transmission of the block data does not change according to the compression rate e.

Therefore, for the block data that is late in capture start order, the processing time required for the compression process is reduced, and the compression process can be completed by the display point in time. Therefore, by performing the compression process on the block data that is critical on the transmission delay at the low compression rate e, the moving picture in which all data corresponding to one picture is required for display can be transmitted with little delay.

[3-2. Configurations of Transmission Apparatus and Reception Apparatus]

Next, configurations of the transmission apparatus 10 and the reception apparatus 20 that constitute the moving picture transmission system will be described with reference to FIG. 4. In FIG. 4, a transmission path of the block data is indicated by a solid line arrow, and a transmission path of a control command is indicated by a dotted line arrow.

FIG. 4 illustrates major functional configurations of the transmission apparatus 10 and the reception apparatus 20. As illustrated in FIG. 4, the transmission apparatus 10 includes an input interface (I/F) 11, a capture unit 12, a compression coding unit 13, a packetization unit 14, an FEC coding unit 15, an RTP transmission unit 16, an RTP control protocol (RTCP) unit 17, and a compression rate setting unit 18.

The input I/F 11 receives a moving picture signal supplied from the video camera V as data. The capture unit 12 takes in data supplied from the input I/F 11 as block data of line block units. The capture unit 12 notifies the compression rate setting unit 18 of the line block number k of the captured line block. The line block number k is given to data corresponding to one picture such that k=1 to N are given to line blocks in which a capture point in time is first to n-th.

The compression coding unit 13 performs the compression coding on the block data supplied from the capture unit 12. The compression coding unit 13 performs the compression coding on the block data at the compression rate e notified of by the compression rate setting unit 18. As the compression rate of the block data increases, the processing time of the compression coding increases. Further, the compression coding may be omitted depending on the system condition. In this case, the compression coding unit 13 supplies the block data to the packetization unit 14 in a non-compression state without performing the compression coding on the block data.

The packetization unit 14 packetizes the compression data supplied from the compression coding unit 13 into RTP packets. The FEC coding unit 15 performs the FEC coding on the packets supplied from the packetization unit 14. In the FEC coding, the redundant coding on the packet is performed using an erasure error correcting code (ECC) such as a Reed-Solomon code. A redundancy of the FEC coding may be changed based on transmission path information or a transmission rate of the block data. The RTP transmission unit 16 transmits the packet on which the FEC coding has been performed to the reception apparatus 20 via the transmission path NW.

The RTCP unit 17 controls a session for transmitting/receiving data to/from the reception apparatus 20 by the RTP. The RTCP unit 17 acquires transmission path information representing the status of the transmission path NW, for example, by transmitting an RTP transmission report (SR) packet and receiving an RTCP reception report (RR) packet that are specified in IETF RFC3550 to and from an RTCP unit 27 of the reception apparatus 20. The RTCP unit 17 notifies the compression rate setting unit 18 of the acquired transmission path information. As the transmission path information, various parameters such as a round trip time (RTT) and an average packet loss rate are used.

The compression rate setting unit 18 dynamically sets the compression rate e of the data block based on the line block number k. Further, the compression rate setting unit 18 may dynamically set the compression rate e of the data block in view of the transmission path information. The compression rate e is set in a range between a minimum compression rate emin and a maximum compression rate emax. Further, 1.0 (non compression) may be set as the compression rate e depending on the system condition. The compression rate setting unit 18 notifies the compression coding unit 13 of a set value of the compression rate e. As a result, in the moving picture transmission system, it is possible to compress and transmit each block data at a different compression rate e based on the capture start order (and the status of the transmission path NW). Dynamic setting of the compression rate e will be described later.

As described in FIGS. 3A and 3B, the transmission apparatus 10 performs the processes of the capture (a), the compression coding (b), the packetization (c), the FEC coding (d), and the RTP transmission (e) in parallel on a plurality of block data.

Further, the functional configuration of the transmission apparatus 10 may be implemented by hardware, and at least a part thereof may be implemented by software. In the latter case, a control unit (not shown) disposed in the transmission apparatus 10 executes a program for executing a moving picture transmission method.

The reception apparatus 20 includes an RTP reception unit 21, an FEC decoding unit 22, a depacketization unit 23, a compression decoding unit 24, a display processing unit 25, an output I/F 26, and an RTCP unit 27.

The RTP reception unit 21 receives the packets from the transmission apparatus 10 through the transmission path NW. The RTP reception unit 21 receives the packets on which the FEC coding has been performed. The FEC decoding unit 22 performs the FEC decoding on the packets, on which the FEC coding has been performed, supplied from the RTP reception unit 21. The depacketization unit 23 depacketizes the packets supplied from the RTP reception unit 21 into compression data (or non-compression data).

The compression decoding unit 24 receives the compression data from the depacketization unit 23 and decodes the compression data into the block data. The compression decoding unit 24 performs the compression decoding on the compression data compressed at a predetermined compression rate e and stores the decoded data in a buffer (not shown). As the compression rate e of the block data increases, the processing time of the compression decoding increases. Further, depending on the system condition, the compression decoding may be omitted.

The display processing unit 25 receives the block data corresponding to one picture from the compression decoding unit 24 and performs the display process to generate the moving picture signal. The output I/F 26 receives the moving picture signal from the display processing unit 25 and outputs the moving picture signal to the display D. The RTCP unit 27 controls a session for transmitting/receiving data to/from the transmission apparatus 10 by the RTP. Further, the RTCP unit 27 is configured similarly to the RTCP unit 17 of the transmission apparatus 10.

As described in FIGS. 3A and 3B, the reception apparatus 20 performs the processes of the RTP reception (e'), the FEC decoding (f), the depacketization (g), and the compression decoding (h) in parallel on a plurality of block data.

Further, the functional configuration of the reception apparatus 20 may be implemented by hardware, and at least a part thereof may be implemented by software. In the latter case, a control unit (not shown) disposed in the reception apparatus 20 executes a program for executing a moving picture transmission method.

[3-3. Dynamic Setting of Compression Rate]

FIG. 5 to FIGS. 8A and 8B illustrate scenarios A to D for dynamically setting the compression rate e. It is assumed that a reference compression rate e0 in which dynamic setting of the compression rate e is not performed is 2.0, a maximum compression rate emax is 4.0, and a minimum compression rate emin is 1.2. The compression rates are exemplary and may be variously set according to the system. Further, it is assumed that a reference bit rate for transmitting data corresponding to one picture at the reference compression rate e0 is R0.

In the scenario A illustrated in FIG. 5, a predetermined amount of data that is late in capture start order is set to a low compression rate e. FIG. 5 illustrates a status of a block process, a setting status of the compression rate e, and a bit rate R on the line blocks corresponding to one picture in the scenario A. Further, as the status of the block process, only the processes of the capture (a), the compression coding (b), the transmission (e), and the compression decoding (h) are illustrated in an order of (a), (b), (e), and (h).

In the scenario A, a case in which transmission at an average RTT is supposed, but the process on processing blocks of k=N−1 and N cannot be completed by the display point in time is assumed. In this case, the compression rates e of the block data of k=N−1 and N are set to 1.5 and 1.2 (=emin), respectively, which are lower than the reference compression rate e0, respectively. Further, the bit rate R of data corresponding to one picture is higher than the reference bit rate R0. The compression rate e is set based on the capture start point in time of the block data and the processing time Ttotal of the processing block so that the process on the processing block can be completed by the display point in time.

Further, the compression rate e may be set so that the process on the processing block can be completed with the margin time by the display point in time. Further, the compression rate e may be set to the same value (for example, e=1.2) other than the different values on a plurality of block data.

Specifically, the processing time Ttotal of the processing block is obtained by a sum of the processing times of the capture (a), the compression coding (b), the packetization (c), the FEC coding (d), the transmission (e), the FEC decoding (f), the depacketization (g), and the compression decoding (h). Here, the processing times of the processes excluding the transmission (e) and the compression processes (b) and (h) are set to a predetermined value. The processing time of the transmission (e) is obtained based on the average RTT, and the processing times of the compression processes (b) and (h) are obtained using the compression rate e as a parameter.

The compression rate e of each block data is obtained so that the processing time Ttotal of the processing blocks can be less than the processible time Tremain. The processible time Tremain is set as a time from completion of the process of each block data to the display point in time as illustrated in FIG. 3A.

In the scenario A, the compression rates e are set to 1.5 and 1.2, respectively, so that the processing time Ttotal of the processing blocks of k=N−1 and N can be less than the processible time Tremain. Therefore, on the block data of k=N−1 and N, the processing time of the compression processes (b) and (h) can be reduced, and a process of the processing block can be completed by the display point in time. Further, when the compression processes (b) and (h) are simultaneously performed on a plurality of processing blocks, an implementation can be made by dividing into a plurality of threads.

Here, depending on the system condition, in order to further reduce the processing time of the compression processes (b) and (h), the compression rate e may be set to 1.0 (non compression). When the compression rate e is 1.0, the processing time of the compression processes (b) and (h) is nearly zero (0), and the processing time Ttotal of each processing block can be further reduced.

Further, if the compression rate e of some block data (for example, k=N−1 and N) is low, the processing block of the block data that is earlier in capture start order than the corresponding block data (for example, k=N−2) may become critical on the transmission delay. In this case, even on the block data that becomes critical, the compression rate e is set lower than the reference compression rate e0.

In the scenario B illustrated in FIG. 6, a predetermined number of block data that is late in capture start order is set to a low compression rate e, and a predetermined number of block data that is early in capture start order is set to a high compression rate e. FIG. 6 illustrates a status of the block process, a setting status of the compression rate e, and a bit rate R on the line blocks corresponding to one picture in the scenario B.

In this case, the compression rates e of the block data of k=N−1 and N are set to 1.5 and 1.2 (=emin), which are lower than the reference compression rate e0, respectively, and the compression rate e of the block data of k=1 to n1 is set to 4.0 (=emax). The compression rate e of each block data is set so that the process on the processing block can be completed by the display point in time. Further, the compression rates e on the block data of k=1 to n1 may be set to different values rather than the same value.

Here, if a predetermined number of block data is set to a low compression rate e as in the scenario A, the bit rate R of data corresponding to one picture increases. Therefore, in order to suppress the bit rate R from increasing, a predetermined number of block data that is early in capture start order is set to a high compression rate. Further, for the block data that is early in capture start order, since there is a sufficient margin time from completion of processing to the display point in time as illustrated in FIG. 3A, the transmission delay is not caused. Therefore, the bit rate R of data corresponding to one picture does not increase, the processing time of the compression processes (b) and (h) can be reduced, and the process on the processing block can be completed by the display point in time.

In the scenario C illustrated in FIG. 7, the compression rate e of each block data is set so that the bit rate R of data corresponding to one picture can become a predetermined value. FIG. 7 illustrates a status of the block process, a setting status of the compression rate e, and a bit rate R on the line blocks corresponding to one picture in the scenario C.

In the scenario C, a case where the bit rate R of data corresponding to one picture is the reference bit rate R0 is described. However, the compression rate e may be set so that the bit rate R can become a bit rate other than the reference bit rate R0.

In this case, the compression rate e of the block data is set to e1=3.0 in k=1 to N1 (the block number n1), e2=2.0 (=e0) in k=N1+1 to N−2 (the block number n2), and e3=1.2 (=emin) in k=N−1 and N (the block number n3). Here, a combination of the compression rate e and the block number, and a classification number of the compression rate e are merely exemplary. Further, the compression rate e of each block data can be set so that the process on the processing block can be completed by the display point in time.

Here, the compression rates e1 to e3 are set to satisfy a relationship of e1·n1+e2·n2+n3=e0·(n1+n2+n3). As a result, the bit rate of data corresponding to one picture can be maintained at a predetermined value, the processing time of the compression processes (b) and (h) can be reduced, and processing of the processing block can be completed by the display point in time.

FIGS. 8A and 8B illustrate a case where the compression rate e of each block data is set according to the status of the transmission path NW. In FIGS. 8A and 8B, on the line blocks corresponding to one picture in the scenario D, in the case where the transmission path NW is stable and in the case where the transmission path NW is unstable, a change status of the RTT, a status of block processing, and a setting status of the compression rate e are illustrated, respectively. Further, the case where the transmission path NW is unstable may include, for example, a case where a change of the RTT is large or a case where a packet reorder occurs in the transmission path NW.

Even in the scenario D, a case in which transmission at an average RTT (RTTavg) is supposed but the process on the processing blocks of k=N−1 and N cannot be completed by the display point in time is assumed. Further, the status of the transmission path NW is judged, for example, according to whether or not a change rate between an RTT achieved at the time of transmission of a picture of an immediately previous frame and an RTT achieved at the time of transmission of a picture of the same frame (already transmitted block data) satisfies a predetermined threshold value.

When the status of the transmission path NW is stable as illustrated in FIG. 8A, the processing time of the transmission (e) is almost as constant as an RTTavg/2. Thus, the processing time Ttotal of the processing block changes according to the processing time of the compression processes (b) and (h). For this reason, the compression rates e of the block data of k=N−1 and N are set to 1.5 and 1.2 that are lower than the reference compression rate e0, respectively.

Here, in setting of the compression rate e of the block data of k=N−1 and N, the processing time Ttotal of each processing block is obtained by using an RTTavg/2 as the processing time of the transmission (e). The compression rate e of each block data is obtained so that the margin time Tremain from completion of processing of each processing block to the display point in time can be equal to or more than zero (0).

Meanwhile, when the status of the transmission path NW is unstable as illustrated in FIG. 8B, since the processing time of the transmission (e) changes, the processing time Ttotal of the processing block changes according to the processing time of the transmission (e) as well as the processing time of the compression processes (b) and (h). For this reason, a predetermined number of block data that is late in capture start order is set to a low compression rate e according to the status of the transmission path NW.

In setting of the compression rate e of each block data, the processing time (an expected transmission time) of the transmission (e) that is expected to be achieved with a predetermined probability is obtained. For example, an expected transmission time that is achieved with a probability of 80% is obtained as an 80% value when ½ of the most recent RTTs are lined up in order starting from a lower value (an ascending order). As the most recent RTTs, a predetermined number of most recent data among the RTTs used to judge the status of the transmission path NW is used. The expected transmission time may be obtained as a value other than an 80% value.

Next, the processing time Ttotal of each processing block is obtained by using the expected transmission time as the processing time of the transmission (e). The compression rate e of each block data is obtained so that the margin time Tremain from completion of processing of each processing block to the display point in time can be equal to or more than zero (0).

For example, in the scenario D, the compression rate e of each processing block is obtained by using an 80% value of ½ of the most recent RTTs as the expected transmission time. In the scenario D, under the assumption that non-compression transmission is possible, the compression rates e on the block data of k=N−2, N−1, and N are set to 1.5, 1.2, and 1.0, respectively. For the block data of k=N, the processing time of the compression coding (b) and the compression decoding (h) is nearly zero (0). As a result, the processing time of the compression processes (b) and (h) is reduced in view of the status of the transmission path NW, so that processing of the processing block can be completed by the display point in time.

The block data that has the low compression rate e according to the status of the transmission path NW is not limited to a predetermined number of block data that is latest in capture start order. For example, the block data that is intermediate in capture start order may have the low compression rate e. In both cases, the time required for the compression process can be reduced by decreasing the compression rate e of the block data, so that the transmission delay of the moving picture that occurs due to the change of the transmission path NW can be suppressed.

[3-4. Operation of Moving Picture Transmission System]

Figure 9A:
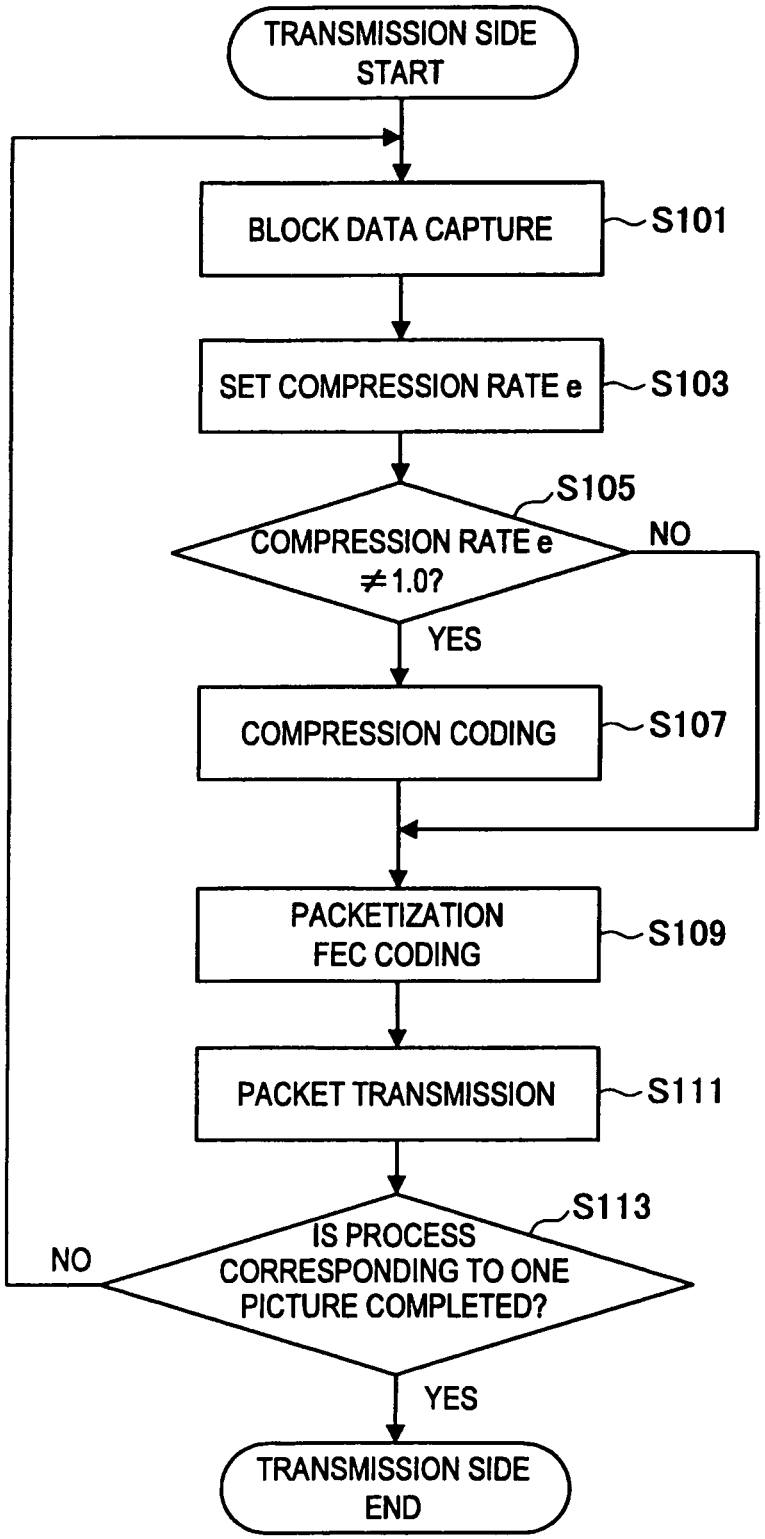
FIG. 9A is a flowchart (1/2) illustrating an operation procedure of a moving picture transmission system.
Figure 9B:
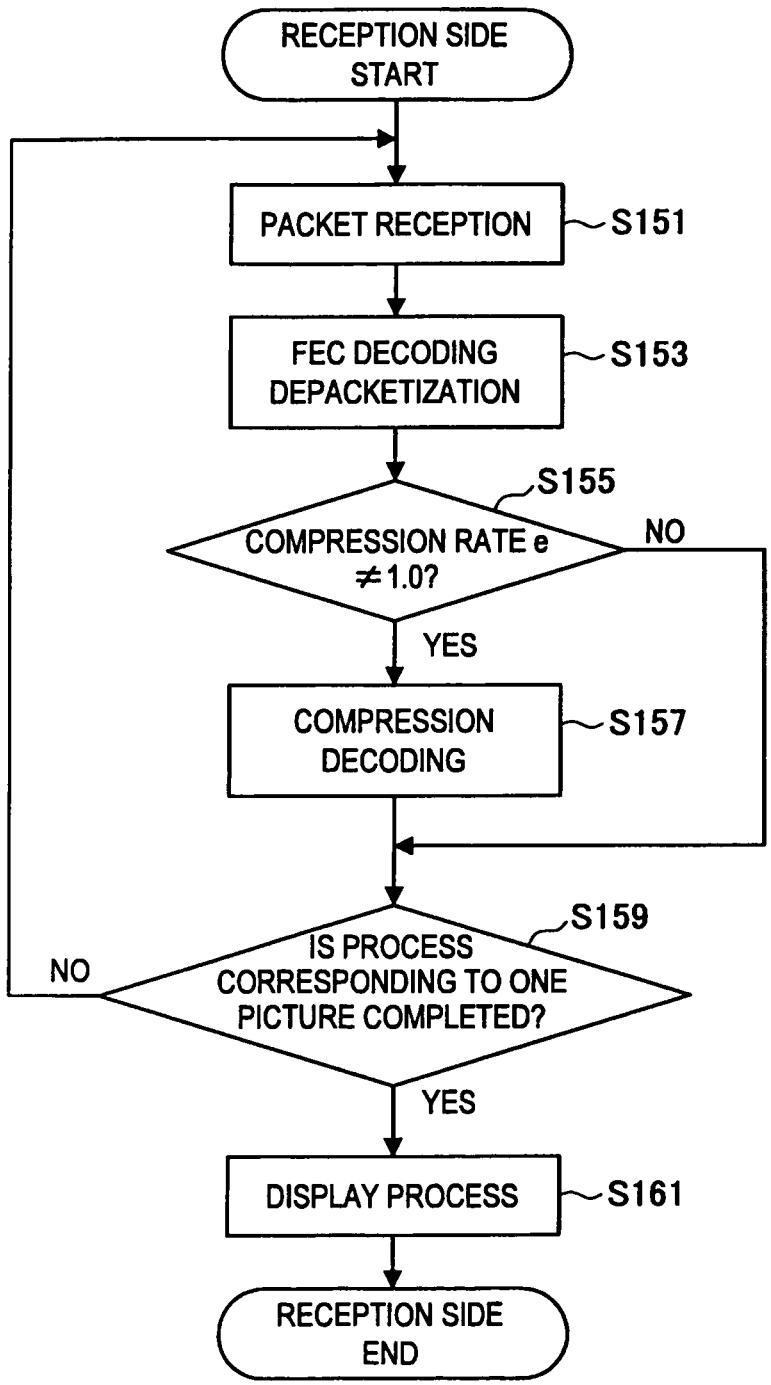
FIG. 9B is a flowchart (2/2) illustrating an operation procedure of a moving picture transmission system.

Next, an operation of the moving picture transmission system will be described with reference to FIGS. 9A and 9B. FIGS. 9A and 9B illustrate operation procedures of the transmission apparatus 10 and the reception apparatus 20 from the start of the capture to the display of the moving picture on data corresponding to one picture, respectively.

Further, FIGS. 9A and 9B illustrate that the process is completed in units of line blocks. However, actually, as described above, the process on a plurality of line blocks is performed in parallel such that when the capture (a) of the line block is completed, the compression coding (b) of the corresponding line block starts, and the capture (a) of another line block starts.

First, an operation of the transmission apparatus 10 will be described. As illustrated in FIG. 9A, in the transmission apparatus 10, in step S101, the capture unit 12 captures data of the line block unit as block data. In the process of step S101, each time the process is performed, the block data of the line block numbers k=1 to N is sequentially captured.

In step S103, the compression rate setting unit 18 dynamically sets the compression rate e of each block data, based on the line block number k from the capture unit 12, according to the above-described setting method. Further, when the block data can be transmitted in an uncompressed state, the compression rate e may be set to 1.0, that is, the non-compression.

In step S105, the compression coding unit 13 confirms whether or not the compression rate e is set to a value other than 1.0. When the compression rate e is set to a value other than 1.0, in step S107, the compression coding unit 13 performs the compression coding on the block data at the set compression rate e. The block data on which the compression coding has been performed or the block data on which the compression coding has not been performed is supplied to the packetization unit 14.

In step S109, the packetization unit 14 packetizes the compression data or the non-compression data into the RTP packets, and the FEC coding unit 15 performs the FEC coding on the packets. In step S111, the RTP transmission unit 16 transmits the packets on which the FEC coding has been performed to the reception apparatus 20.

Further, in step S113, the transmission apparatus 10 judges whether or not processing of data corresponding to one picture has been completed based on the line block number k, that is, whether or not the block data of the line block number k=N has been processed. When the process has been completed, the process of the transmission side on data corresponding to one picture is completed. However, when not completed, in step S101, the line block number k increases by one, and data of the next line block is captured.

Next, an operation of the reception apparatus 20 will be described. As illustrated in FIG. 9B, in the reception apparatus 20, in step S151, the RTP reception unit 21 receives the packets from the transmission apparatus 10 through the transmission path NW. As the packets, the packets on which the FEC coding has been performed are received.

In step S153, the FEC decoding unit 22 performs the FEC decoding on the packets on which the FEC coding has been performed, and the depacketization unit 23 depacketizes the packets. In step S155, the compression decoding unit 24 confirms whether or not the depacketized data is the compression data. In step S157, when the data is the compression data, the compression decoding unit 24 performs the compression decoding on the depacketized data and stores the decoded data in a buffer (not shown).

If the process of step S157 is finished, in step S159, it is judged whether or not the process corresponding to one picture has been completed. When the process has been completed, in step S161, the display process on data corresponding to one picture is performed. However, when not completed, in step S151, the packets of the next line blocks are received.

[3-5. Summary]

As described above, according to the moving picture transmission system according to the first embodiment of the present invention, the moving picture in which all data corresponding to one picture is required for display is transmitted. In the system, data corresponding to one picture is captured as the block data of the line block unit. Further, the compression rate e of the block data is dynamically set according to the capture point in time of the block data. Here, the compression rate e of the block data that is late in capture start order is lower than that of the block data that is early in capture start order. Further, in the present embodiment, it is assumed that the transmission path NW has the sufficiently large band, and a time required for transmission of the block data does not change according to the compression rate e.

Therefore, in the block data that is late in capture start order, the processing time required for the compression process can be reduced, and the compression process can be completed by the display point in time. By performing the compression process on the block data that becomes critical on the transmission delay at the low compression rate e, the moving picture in which all data corresponding to one picture is required for display can be transmitted with little delay.

<4. Moving Picture Transmission System According to Second Embodiment>

A moving picture transmission system according to a second embodiment of the present invention will be described below. According to the moving picture transmission system of the present embodiment, the moving picture in which all data corresponding to one picture is required for display may be transmitted with little delay while suppressing the consumption of communication resources.

[4-1. Process Status of Moving Picture Transmission]

Figure 10A:
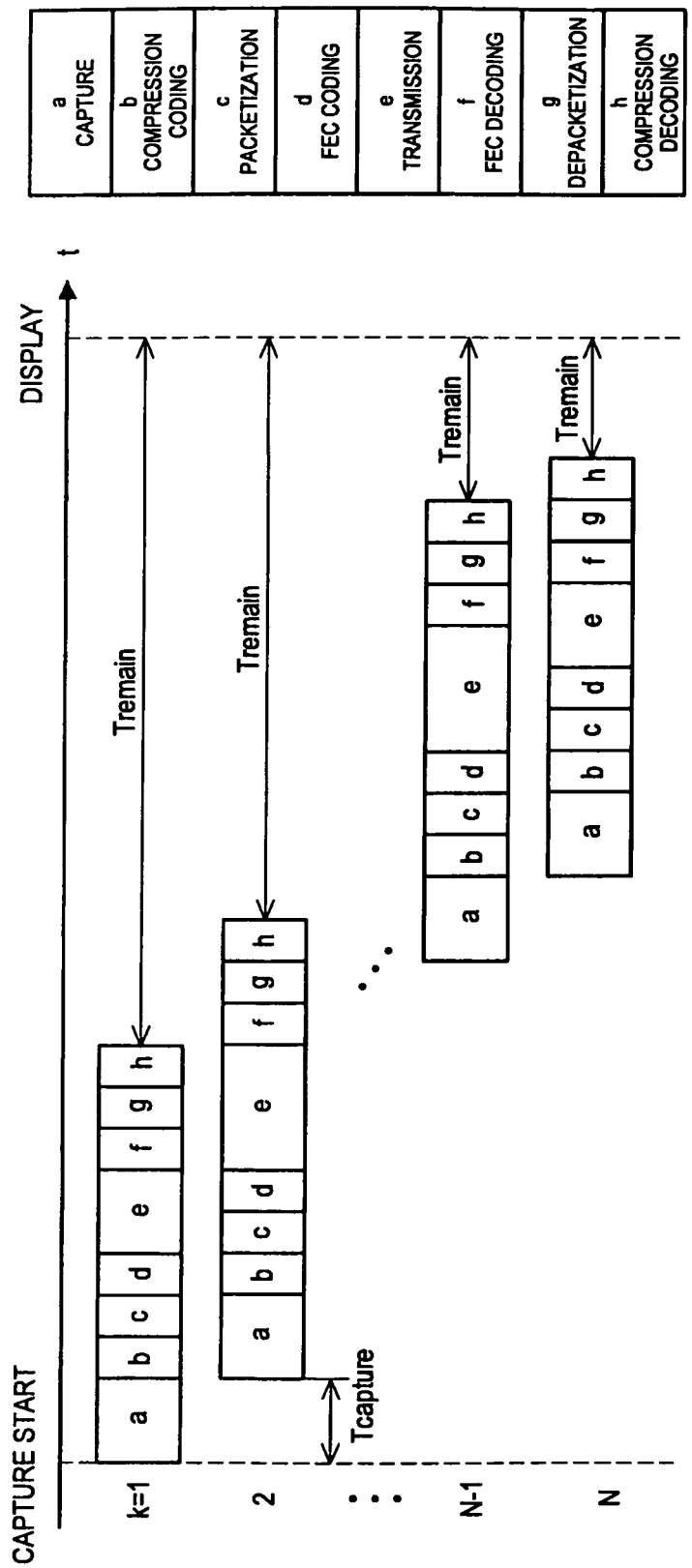
FIG. 10A is a diagram (1/2) illustrating a process status of moving picture transmission by a line block unit scheme according to a second embodiment of the present invention.
Figure 10B:
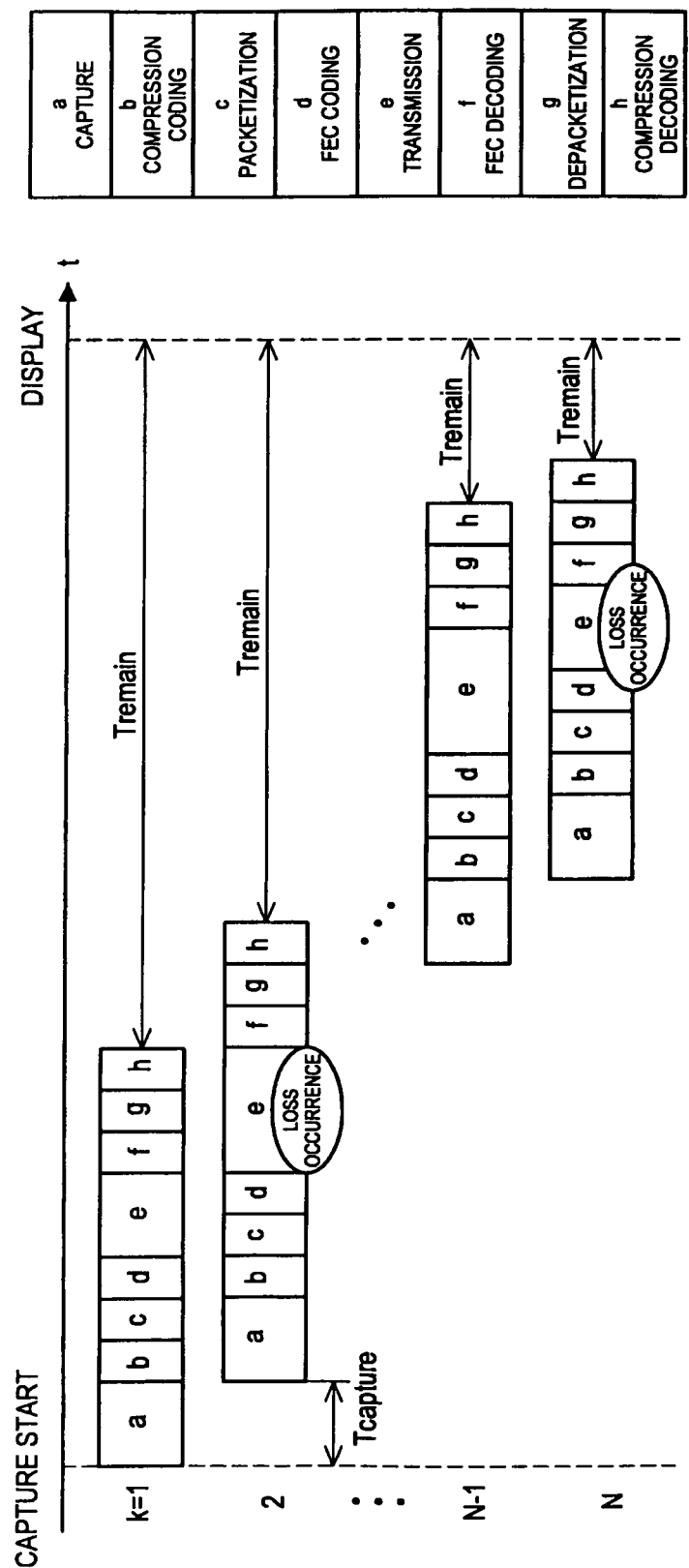
FIG. 10B is a diagram (2/2) illustrating a process status of moving picture transmission by a line block unit scheme according to the second embodiment of the present invention.

FIGS. 10A and 10B illustrate process statuses of moving picture transmission by the line block unit scheme according to the present embodiment. FIGS. 10A and 10B illustrate processes (a) to (h) executed in units of line blocks.

In FIG. 10A, in the moving picture corresponding to one picture, the capture start point in time and the display point in time of the moving picture are illustrated on a horizontal axis. Further, processing blocks of line block units are illustrated in parallel in a vertical axis direction in a process start order.

As illustrated in FIG. 10A, the processing blocks are processed in parallel with an offset Tcapture corresponding to a processing time required in the capture (a). The times required in the processes (a) to (d) and (f) to (h) excluding the transmission (e) are nearly the same between the processing blocks, but the processing time required in the transmission (e) changes according to a status of the transmission path NW.

Since each processing block starts with the offset Tcapture, the processing block that is early in capture start order has a sufficient margin time Tremain between completion of the processes (a) to (h) and the display point in time. However, the processing block that is late in capture start order has little margin time Tremain.

For this reason, as illustrated in FIG. 10B, in the case of the processing block that is early in capture start order, even when packet loss of block data occurs at the time of transmission, the lost packet can be comparatively easily restored by automatic retransmission of the packet by the display point in time. However, in the case of the processing block that is late in capture start order, it is difficult to restore the lost packet by automatic retransmission of the packet by the display point in time. Therefore, in the moving picture transmission process of the line block unit scheme, the block data that is late in capture start order, particularly, the last block data, becomes critical on the transmission delay.

Meanwhile, in the FEC process (coding and decoding), since the redundant coding is performed on the packet of the block data and then the redundant packet is transmitted, many communication resources such as the band of the transmission path NW and the processing time required for the FEC coding (coding and decoding) are expended.

For this reason, in the present embodiment, as the error correction scheme at the time of transmission, any one of the FEC coding scheme and an automatic retransmission (ARQ) scheme is used according to the capture point in time and the status of the transmission path NW. The details will be described later, but the ARQ scheme is used for the block data that can be restored by retransmission, and the FEC coding scheme is used for the block data that cannot be restored by retransmission. Further, when a target loss rate Parq after error correction can be achieved, the ARQ scheme is used according to the status of the transmission path NW.

As a result, the block data that is early in capture start order is restored by retransmission of the lost packet, and the block data that is late in capture start order is restored by receiving a predetermined number of packets among the packets that have been subjected to the redundant coding and transmitted. Thus, by using the FEC coding scheme only for the block data that becomes critical on the transmission delay, the moving picture in which all data corresponding to one picture is required for display can be transmitted with little delay while suppressing the consumption of the communication resources.

[4-2. Configurations of Transmission Apparatus and Reception Apparatus]

Next, configurations of a transmission apparatus 110 and a reception apparatus 120 that constitute the moving picture transmission system will be described with reference to FIG. 11. In FIG. 11, a transmission path of the block data is indicated by a solid line arrow, and a transmission path of a control command or the like is indicated by a dotted line arrow.

The transmission apparatus 10 and the reception apparatus 20 illustrated in FIG. 1 correspond to the transmission apparatus 110 and the reception apparatus 120 according to the present embodiment, respectively. However, in the present embodiment, the transmission apparatus 110 performs the FEC coding (d) as necessary, and the reception apparatus 120 performs the FEC decoding (f) as necessary.

FIG. 11 illustrates major functional configurations of the transmission apparatus 110 and the reception apparatus 120. As illustrated in FIG. 11, the transmission apparatus 110 includes an input I/F 111, a capture unit 112, a compression coding unit 113, a packetization unit 114, an FEC coding unit 115, an RTP transmission unit 116, an RTCP unit 117, an ARQ control unit 118, and a FEC use decision unit 119.

The input I/F 111 receives a moving picture signal supplied from the video camera V as data. The capture unit 112 takes in data supplied from the input I/F 111 as block data of line block units. The capture unit 112 notifies the FEC use decision unit 119 of the line block number k of the captured line block. The line block number k is given to data corresponding to one picture such that k=1 to N are given to line blocks in which a capture point in time is first to n-th.

The compression coding unit 113 performs the compression coding on the block data supplied from the capture unit 112. The packetization unit 114 packetizes the compression data supplied from the compression coding unit 113 into RTP packets.

The FEC coding unit 115 performs the FEC coding on the packets supplied from the packetization unit 114 according to an FEC instruction from the FEC use decision unit 119. In the FEC coding, the redundant coding on the packet (original data) is performed using an erasure ECC such as a Reed-Solomon code.

The RTP transmission unit 116 transmits the packet on which the FEC coding has not been performed or the packet on which the FEC coding has been performed to the reception apparatus 120 via the transmission path NW. Further, the RTP transmission unit 116 retransmits the packet that is lost due to packet loss at the time of transmission among the packets on which the FEC coding has not been performed according to the ARQ instruction from the ARQ control unit 118. The packet on which the FEC coding has not been performed is stored in a buffer (not shown) until reception is acknowledged.

The RTCP unit 117 controls a session for transmitting/receiving data to/from the reception apparatus 120 by the RTP. The RTCP unit 117 acquires transmission path information representing the status of the transmission path NW, for example, by transmitting an RTP SR packet and receiving an RTCP RR packet that are specified in IETF RFC3550 to and from an RTCP unit 129 of the reception apparatus 120. The RTCP unit 117 notifies the FEC use decision unit 119 of the acquired transmission path information. As the transmission path information, various parameters such as an RTT and an average packet loss rate P1 are used.

Further, when a retransmission request (NACK) packet is received from the RTCP 129 of the reception apparatus 120, the RTCP unit 117 notifies the ARQ control unit 118 of the ARQ instruction. The ARQ control unit 118 controls retransmission of the lost packet performed by the RTP transmission unit 116 in response to the ARQ instruction from the RTCP unit 117.

The FEC use decision unit 119 dynamically decides whether or not the FEC coding is to be used as the error correction scheme at the time of transmission based on the transmission path information and the line block number k. When it is decided that the FEC coding scheme is to be used, the FEC use decision unit 119 notifies the FEC coding unit 115 of an FEC instruction. A judgment condition for deciding a use of the FEC coding scheme will be described later.

Further, the FEC use decision unit 119 may change a redundancy of the FEC coding based on the transmission path information, the amount of an ARQ retransmission packet, or the transmission rate of the block data. In this case, by decreasing the redundancy when a variation of the RTT is small and increasing the redundancy when a variation of the RTT is large, the target loss rate after error correction can be achieved.

As a result, in the moving picture transmission system, for the block data that is a use target of the FEC coding scheme, the lost packet is restored by the FEC coding scheme, and for the block data that is not a use target of the FEC coding scheme, the lost packet is restored by the ARQ scheme.

Further, as illustrated in FIGS. 10A and 10B, the transmission apparatus 110 performs the processes of the capture (a), the compression coding (b), the packetization (c), the FEC coding (d), and the RTP transmission (e) in parallel on a plurality of block data.

Further, the functional configuration of the transmission apparatus 110 may be implemented by hardware, and at least a part thereof may be implemented by software. In the latter case, a control unit (not shown) disposed in the transmission apparatus 110 executes a program for executing a moving picture transmission method.

The reception apparatus 120 includes an RTP reception unit 121, an FEC decoding unit 122, a depacketization unit 123, a compression decoding unit 124, a display processing unit 125, an output I/F 126, a loss detection unit 127, an ARQ control unit 128, and an RTCP unit 129.

The RTP reception unit 121 receives the packets from the transmission apparatus 110 through the transmission path NW. The RTP reception unit 121 receives the packets on which the FEC coding has not been performed or the packets on which the FEC coding has been performed. The FEC decoding unit 122 performs the FEC decoding on the packets on which the FEC coding has been performed supplied from the RTP reception unit 121.

The depacketization unit 123 depacketizes the packets supplied from the RTP reception unit 121 into compression data. Further, the packets on which the FEC coding has been performed are supplied to the depacketization unit 123 after the FEC decoding, and the packets on which the FEC coding has not been performed are supplied to the depacketization unit 123 without the FEC decoding.

The compression decoding unit 124 receives the compression data from the depacketization unit 123, decodes the compression data into the block data, and stores the block data in a buffer (not shown). The display processing unit 125 receives the block data corresponding to one picture from the compression decoding unit 124 and performs the display process to generate the moving picture signal. The output I/F 126 receives the moving picture signal from the display processing unit 125 and outputs the moving picture signal to the display D.

The loss detection unit 127 detects packet loss based on reception information supplied from the RTP reception unit 121 and notifies the ARQ control unit 128 of the detection result. For example, a sequence number stated in a packet header is checked, and when the sequence numbers of the received packets are discontinuous, the packet loss is detected.

Here, detection of the packet loss is performed only on the packet on which the FEC coding has not been performed but is not performed on the packet on which the FEC coding has been performed. This is because, for the packet on which the FEC coding has been performed, the lost packet is restored by the FEC coding scheme rather than the ARQ scheme.

The ARQ control unit 128 adds NACK packet information for specifying the lost packet based on the detection result supplied from the loss detection unit 127 to a NACK list. The ARQ control unit 128 reads out the NACK information from the NACK list at a predetermined time and transmits the NACK packet to the transmission apparatus 110 through the RTCP unit 129.

For example, the NACK packet conforms to a format stated in an IETF Internet Draft [Extended RTP Profile for RTCP-based Feedback].

Point-in-time information of "NACK timeout" and "NACK deadline" of each NACK packet is set in the NACK list. For example, "NACK timeout" is set as a point in time when the RTT elapses from transmission of the NACK packet. "NACK deadline" is set as a point in time earlier than an arrival scheduled point-in-time of the packet or the like and the RTT.

When the packet loss is detected, the ARQ control unit 128 transmits the NACK packet to the transmission apparatus 110 through the RTCP unit 129. If the retransmission packet is not received even after the point in time of "NACK timeout," the NACK packet is retransmitted. The NACK packet is repetitively retransmitted by the point in time at which "NACK deadline" elapses.

As described in FIGS. 10A and 10B, the reception apparatus 120 performs the processes of the RTP reception (e'), the FEC decoding (f), the depacketization (g), and the compression decoding (h) in parallel on a plurality of block data.

Further, the functional configuration of the reception apparatus 120 may be implemented by hardware, and at least a part thereof may be implemented by software. In the latter case, a control unit (not shown) disposed in the reception apparatus 120 executes a program for executing a moving picture transmission method.

[4-3. Use Judgment of FEC Coding Scheme]

FIG. 12 schematically illustrates the judgment condition for deciding the use of the FEC coding scheme as the error correction scheme.

First, the target loss rate Parq after error correction is set. For example, the target loss rate Parq is set as Parq=10-6 in moving picture transmission for an Internet protocol television (IPTV). Next, under the assumption that error correction is to be performed by the ARQ scheme, the number of times of retransmission Nnet of the packet required for achieving the target loss rate Parq is estimated. The number of times of retransmission Nnet is estimated by Equation 1 in view of an average packet loss rate P1 obtained as the transmission path information. A retransmission time tarq required for retransmitting the packet the number of times of retransmission Nnet is calculated. The retransmission time tarq is calculated by Equation 2 based on the RTT obtained as the retransmission path information.

Equation 1 is based on the description of Yoshinobu Kure et al., "A study of the Intelligent QoS Control Method for Real-time Communication Systems", IEICE Tech. Rep., vol. 107, No. 19, CQ2007-1, pp. 1-6, April 2007.

[Formula 1]

$$P_{arq} = P_1^{(Nnet+1)}(2-P_1)^{Nnet} \quad \text{(Equation 1)}$$

$$t_{arq} = RTT \times N_{net} \quad \text{(Equation 2)}$$

Here, P1: the average packet loss rate (a random packet loss rate)

Parq: the target loss rate after error correction (a setting value)

Nnet: the number of times of retransmission required for achieving the target loss rate tarq: the retransmission time required for retransmitting the packet the number of times of retransmission RTT: the RTT Meanwhile, a total process time Ttotal required for the whole process of the block data is calculated by Equation 3. The total process time Ttotal is calculated as the sum of the process time Tprocess required for the capture (a), the compression processes (b) and (h), and the packet processes (c) and (g) that are performed at the transmission side and the reception side and the transmission time Ttrans required for the transmission (e). Further, the process time required for the processes (d) and (f) of the FEC process (coding and decoding) is not included in the process time Tprocess since it is assumed that the error correction is to be performed by the ARQ scheme.

Here, the process time Tprocess is previously set according to the moving picture that is a transmission target, and the transmission time Ttrans is set as ½ of the RTT. Thus, the total process time Ttotal changes according to the status of the transmission path NW.

Next, the margin time Tremain between a completion point in time of the whole process (the processes (a) to (c), (e), (g), and (h)) of the whole process of the block data and a display point in time is calculated by Equation 4. The margin time Tremain is calculated as a difference between an available time Tdelay from the capture start of data corresponding to one picture to the display point in time and the finish point in time of the whole process of each block data. Thus, the margin time Tremain increases as the block data is earlier in capture start order and decreases as the block data is late in capture start order.

[Formula 2]

$$T_{total} = T_{process} + T_{trans} \quad \text{(Equation 3)}$$

$$T_{remain} = T_{delay} - \lfloor T_{total} + ((k-1) \times T_{capture}) \rfloor \quad \text{(Equation 4)}$$

Here, Tprocess: the process time of the block data (the processes (a) to (c), (g), and (h))

Ttrans: the transmission time of the block data (the process (e) (=RTT/2))

Ttotal: the total process time of the block data

Tremain: the margin time from the completion point in time of the whole process of the block data to the display point in time Tdelay: the available time from the capture start of data corresponding to one picture to the display point in time Tcapture: the capture time of the block data k: the line block number k (k=1, 2, . . . , N)

Using Equation 2 and Equation 4, it is judged whether or not each block data satisfies the judgment condition of Equation 5.

[Formula 3]

$$t_{arq} \geq T_{remain} \quad \text{(Equation 5)}$$

Here, when the judgment condition is satisfied, since the lost packet cannot be restored by the ARQ scheme while achieving the target loss rate Parq, the use of the FEC coding scheme is decided. However, when the judgment condition is not satisfied, since the lost packet can be restored by the ARQ scheme while achieving the target loss rate Parq, the ARQ scheme is used rather than the FEC coding scheme.

[4-4. Operation of Moving Picture Transmission System]

Figure 13B:
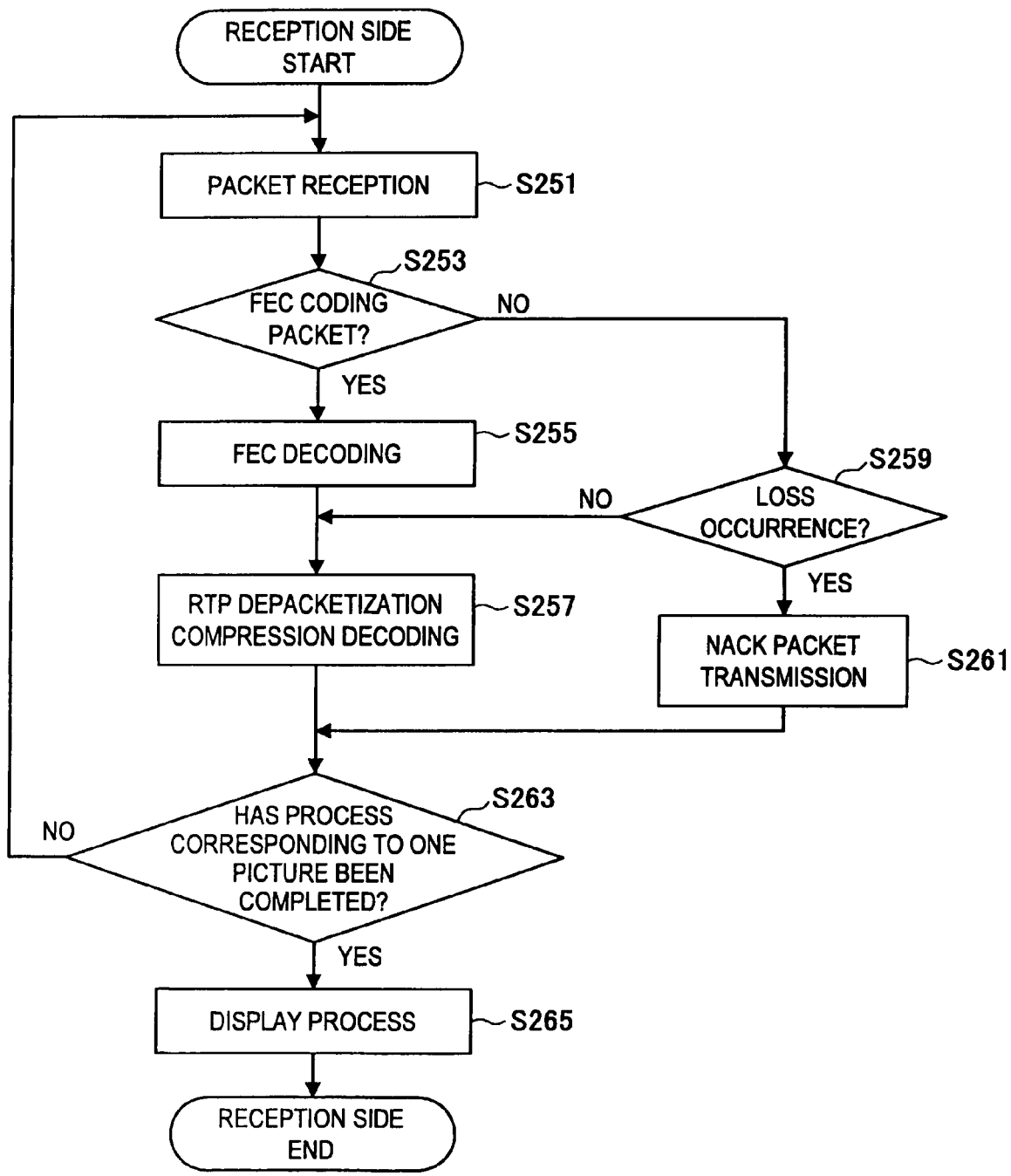
FIG. 13B is a flowchart (2/2) illustrating an operation procedure of a moving picture transmission system.

Next, an operation of the moving picture transmission system will be described with reference to FIGS. 13A and 13B. FIGS. 13A and 13B illustrate operation procedures of the transmission apparatus 110 and the reception apparatus 120 from the start of the capture to the display of the moving picture on data corresponding to one picture, respectively.

Further, in FIGS. 13A and 13B, the process is completed in units of line blocks. However, actually, as described above, the process on a plurality of line blocks is performed in parallel such that when the capture (a) of the line block is completed, the compression coding (b) of the corresponding line block starts, and the capture (a) of another line block starts.

First, an operation of the transmission apparatus 110 will be described. As illustrated in FIG. 13A, in the transmission apparatus 110, in step S201, the capture unit 112 captures data of the line block unit as block data. In the process of step S201, each time the process is performed, the block data of the line block numbers k=1 to N is sequentially captured.

In step S203, the compression coding unit 113 performs the compression coding on the block data, and the packetization unit 114 packetizes the compression data into the RTP packets.

In step S205, the FEC use decision unit 119 decides whether or not the FEC coding scheme is to be used as the error correction scheme at the time of transmission according to the above described judgment condition based on the line block number k from the capture unit 112. Specifically, the FEC use decision unit 119 calculates the retransmission time tarq and the margin time Tremain based on the transmission path information and the line block number k and judges whether or not the judgment condition of Equation 5 is satisfied. When the judgment condition is satisfied, the use of the FEC coding scheme is decided as the error correction scheme, and the FEC instruction is given to the FEC coding unit 115. However, when the judgment condition is not satisfied, the ARQ scheme is used.

In step S207, the FEC coding unit 115 judges whether or not the FEC instruction has been given. When it is judged that the FEC instruction has been given, in step S209, the FEC coding is performed. In step S211, the packet on which the FEC coding has been performed is transmitted to the reception apparatus 120. However, when it is judged that the FEC instruction has not been given, in step S211, the FEC coding is not performed on the packet, and the packet on which the FEC coding has not been performed is transmitted to the reception apparatus 120.

Meanwhile, when the NACK packet is received from the RTCP unit 129 of the reception apparatus 120, the RTCP unit 117 notifies the ARQ control unit 118 of the ARQ instruction. In step S213, the ARQ control unit 118 judges whether or not the ARQ instruction has been given. When it is judged that the ARQ instruction has been given, in step S215, the ARQ control unit 118 controls retransmission of the lost packet and retransmits the lost packet to the reception apparatus 120. The processes of step S213 and step S215 may not be performed as the processes subsequent to step S211 but may be performed in parallel with the processes of step S201 to step S209.

Further, in step S217, the capture unit 112 judges whether or not the capture of data corresponding to one picture has been completed based on the line block number k, that is, whether or not the block data of the line block number k=N has been captured. When it is judged that the capture has been completed, in step S219 to step S223, a judgment on the ARQ instruction and retransmission of the packet are repeated until transmission of the packets corresponding to one picture is completed.

However, when it is judged that the capture has not been completed, in step S201, the capture unit 112 increases the line block number k by one (1) and captures data of the next line block as the block data.

Next, an operation of the reception apparatus 120 will be described. As illustrated in FIG. 13B, in the reception apparatus 120, in step S251, the RTP reception unit 121 receives the packets from the transmission apparatus 110 through the transmission path NW. As the packets, the packets on which the FEC coding has not been performed or the packets on which the FEC coding has been performed are received.

In step S253, the RTP reception unit 121 judges whether or not the FEC coding has been performed on the packet. When it is judged that the FEC coding has been performed on the packet, in step S255, the FEC decoding unit 122 performs the FEC decoding on the packet. Here, when the packet loss occurs, the loss is restored by the redundant packet. Further, in step S257, the depacketization unit 123 depacketizes the packet, and the compression decoding unit 124 performs the compression decoding on the compression data.

However, when it is judged that the FEC coding has not been performed on the packet, in step S259, the loss detection unit 127 detects whether or not the packet loss has occurred in the received packet. The loss detection unit 127 notifies the ARQ control unit 128 of the detection result. When it is judged that the loss has occurred, in step S261, the ARQ control unit 128 transmits the NACK packet to the transmission apparatus 110 through the RTCP unit 129. However, when it is judged that the loss has not occurred, in step S257, the depacketization of the packet and the compression decoding of the compression data are performed.

When the processes of step S257 or step S261 are finished, in step S263, it is judged whether or not the process corresponding to one picture has been finished. When it is judged that the process corresponding to one picture has been finished, in step S265, the display process is performed. However, when it is judged that the process corresponding to one picture has not been finished, in step S251, the packet of the next line block is received.

[4-5. Summary]

As described above, according to the moving picture transmission system according to the second embodiment of the present invention, the moving picture in which all data corresponding to one picture is required for display is transmitted. In the system, data corresponding to one picture is captured as the block data of the line block unit. Further, any one of the FEC coding scheme and the ARQ scheme is used as the error correction scheme at the time of transmitting the packet of each block data according to the status of the transmission path NW and the capture point in time of each block data. Here, for the block data that can be restored by retransmission, the ARQ scheme is used, but for the block data that cannot be restored by retransmission, the FEC coding scheme is used.

As a result, the block data that is early in early in start order of the capture is restored by retransmission of the lost packet, and the block data that is late in start order of the capture is restored by receiving a predetermined number of packets among the packets that have been subjected to the redundant coding and then transmitted. Thus, by using the FEC coding scheme only for the block data that becomes critical on the transmission delay, the moving picture in which all data corresponding to one picture is required for display can be transmitted with little delay while suppressing the consumption of the communication resources.

As described above, the exemplary embodiments of the present invention have been described hereinbefore in detail with reference to the accompanying drawings, but the present invention is not limited to the embodiments. A person having ordinary skill in the art would understand that various modifications or variations can be made within the scope of the technical spirit defined in the claims and included within the technical scope of the invention.

For example, the first embodiment has been described in connection with the case where the parallel processing is performed in units of line blocks. However, the parallel processing may be performed by pipelinization of a processing unit including a predetermined number of block data.

Further, the above description has been made in connection with the case where the FEC coding scheme is used as the error correction scheme at the time of transmission. However, as the error correction scheme at the time of transmission, for example, instead of the FEC coding scheme, a combination of the FEC coding scheme and the ARQ scheme or any other scheme may be used. Further, the error correction may not be performed.

For example, the second embodiment has been described in connection with the case in which the parallel processing is performed in units of line blocks. However, the parallel processing may be performed by pipelinization of a processing unit including a predetermined number of block data. In this case, the use of the FEC coding scheme is decided by calculating the number of times of retransmission Nnet, the retransmission time tarq, the total processing time Ttotal, the capture time Tcapture, and the margin time Tremain on a predetermined number of packets of block data and using the above-described judgment condition.

It should be understood by those skilled in the art that various modifications, combinations, sub-combinations and alterations may occur depending on design requirements and other factors insofar as they are within the scope of the appended claims or the equivalents thereof.

What is claimed is:

1. A moving picture transmission apparatus, comprising:
a capture unit that, divides data corresponding to one picture of a moving picture into a plurality of line blocks including a predetermined number of pixel lines, and captures each line block of the plurality of divided line blocks as a data block;
a compression rate setting unit that dynamically sets a compression rate of the data block based on a capture time of the data block; and
a transmission unit that compresses the data block at the set compression rate and transmits the compressed data block to a reception apparatus through a transmission path;
wherein the capture unit and the transmission unit perform a series of processes including the capture and the transmission of each data block of a plurality of data blocks in parallel, while shifting only a time required for the capture, and
wherein the compression rate setting unit sets the compression rate of a first data block of the plurality of data blocks, corresponding to the one picture to be lower than the compression rate of a second block data of the plurality of data blocks, wherein the first data block is captured later than the second data block in an order of the capture.

2. The moving picture transmission apparatus according to claim 1, wherein the compression rate setting unit sets the compression rate of a predetermined number of data blocks that are latest in the order of the capture to be lower than a reference compression rate.

3. The moving picture transmission apparatus according to claim 2, wherein the compression rate setting unit sets the compression rate of a predetermined number of data blocks that are latest in the order of the capture, to a predefined minimum compression rate.

4. The moving picture transmission apparatus according to claim 3, wherein, when the data block is transmittable in an uncompressed state, the compression rate setting unit sets the compression rate of a predetermined number of data blocks that are latest in the order of the capture to 1.0.

5. The moving picture transmission apparatus according to claim 1, wherein the compression rate setting unit sets the compression rate of a predetermined number of data blocks that are early in the order of the capture to be higher than a reference compression rate.

6. The moving picture transmission apparatus according to claim 5, wherein, when a status of the transmission path is stable, the compression rate setting unit sets the compression rate of a predetermined number of data blocks that are latest in the order of the capture to a predefined minimum compression rate or 1.0.

7. The moving picture transmission apparatus according to claim 5, wherein, when a status of the transmission path is unstable, the compression rate setting unit sets the compression rate of a larger number of data blocks compared to when the status of the transmission path is stable to a predefined minimum compression rate or 1.0.

8. A moving picture transmission method, comprising:
in an electronic transmission apparatus:
dividing data corresponding to one picture of a moving picture into a plurality of line blocks including a predetermined number of pixel lines;
capturing each line block of the plurality of divided line blocks as a data block;
setting a compression rate of the data block based on a capture time of the data block;
compressing the data block at the set compression rate and transmitting the compressed data block to a reception apparatus through a transmission path;
wherein a series of processes including the capture and the transmission of each data block of a plurality of data blocks are performed in parallel, while shifting only a time required for the capture, and
wherein the compression rate a first data block of the plurality of data blocks corresponding to the one picture is set to be lower than the compression rate of a second block data of the plurality of data blocks, wherein the first data block is captured later than the second data block in an order of the capture.

9. A non-transitory computer-readable storage medium having stored thereon, a computer program having at least one code section, the at least one code section being executable by a computer for causing the computer to perform steps comprising:
dividing data corresponding to one picture of a moving picture into a plurality of line blocks including a predetermined number of pixel lines;
capturing each line block of the plurality of divided line blocks as a data block;
setting a compression rate of the data block based on a capture time of the data block;
compressing the data block at the set compression rate and transmitting the compressed data block to a reception apparatus through a transmission path;
wherein a series of processes including the capture and the transmission of each data block of a plurality of data blocks are performed in parallel, while shifting only a time required for the capture, and
wherein the compression rate a first data block of the plurality of data blocks corresponding to the one picture is set to be lower than the compression rate of a second block data of the plurality of data blocks, wherein the first data block is captured later than the second data block in an order of the capture.

* * * * *